US012646196B2

(12) United States Patent
Takeuchi

(10) Patent No.: US 12,646,196 B2
(45) Date of Patent: Jun. 2, 2026

(54) MONITORING SYSTEM FOR MONITORING A SPACE FOR AN ABNORMALITY

(71) Applicant: AISIN CORPORATION, Kariya (JP)

(72) Inventor: Masahiro Takeuchi, Kariya (JP)

(73) Assignee: AISIN CORPORATION, Kariya (JP)

( * ) Notice: Subject to any disclaimer, the term of this patent is extended or adjusted under 35 U.S.C. 154(b) by 952 days.

(21) Appl. No.: 17/830,948

(22) Filed: Jun. 2, 2022

(65) Prior Publication Data

US 2022/0405956 A1      Dec. 22, 2022

(30) Foreign Application Priority Data

Jun. 16, 2021      (JP) ................................. 2021-100248

(51) Int. Cl.
*G06T 7/70*          (2017.01)
*G06V 10/98*          (2022.01)

(52) U.S. Cl.
CPC ................ *G06T 7/70* (2017.01); *G06V 10/98* (2022.01); *G06T 2207/20224* (2013.01); *G06T 2207/30196* (2013.01); *G06T 2207/30268* (2013.01)

(58) Field of Classification Search
CPC ............. G06T 7/70; G06T 2207/20224; G06T 2207/30196; G06T 2207/30268; G06T 7/0002; G06V 10/98; G06V 40/103; G06V 20/59; G06V 40/20; H04N 7/181
See application file for complete search history.

(56) References Cited

U.S. PATENT DOCUMENTS

| | | | |
|---|---|---|---|
| 10,225,492 B1 * | 3/2019 | Steffanson | .............. G06F 18/40 |
| 10,846,538 B2 | 11/2020 | Hayata | |
| 11,254,318 B2 | 2/2022 | Uno | |
| 2010/0242081 A1 * | 9/2010 | Dunn | ................. H04N 21/6408 |
| | | | 725/126 |

(Continued)

FOREIGN PATENT DOCUMENTS

| | | |
|---|---|---|
| CN | 104229574 A | 12/2014 |
| CN | 111626199 A | 9/2020 |

(Continued)

OTHER PUBLICATIONS

Hung, Dao Huu, et al. "An omnidirectional vision system for bus safety surveillance." 2015 12th IEEE International Conference on Advanced Video and Signal Based Surveillance (AVSS). IEEE, 2015. (Year: 2015).*

(Continued)

*Primary Examiner* — Andrew M Moyer
(74) *Attorney, Agent, or Firm* — Sughrue Mion, PLLC

(57) ABSTRACT
A monitoring system includes a first image analysis apparatus provided at an edge of an information communication network together with a camera, and configured to analyze a captured image of a monitored space imaged by the camera so as to execute detection and determination of a state change occurring in the monitored space, an image distribution apparatus configured to execute distribution of the captured image via the information communication network when occurrence of the state change is detected, and a second image analysis apparatus configured to analyze the distributed captured image so as to execute detection and determination of an abnormality occurring in the monitored space.

6 Claims, 15 Drawing Sheets

(56)          References Cited

U.S. PATENT DOCUMENTS

2016/0217326 A1 *   7/2016   Hosoi .................. G06V 10/443
2020/0057891 A1     2/2020   Hayata
2021/0049887 A1 *   2/2021   Hanson ............... A61B 5/0022
2021/0114600 A1     4/2021   Uno

FOREIGN PATENT DOCUMENTS

JP          2000-59759  A      2/2000
JP          2003-299000  A    10/2003
JP          2012-190072  A    10/2012
JP          2016-187176  A    10/2016
JP          2019-22018  A      2/2019
JP          2020-3935  A       1/2020
JP          2021-72474  A      5/2021
KR          10-1449853  B1 *  10/2014   .............. G06T 7/00
WO          2018/105171  A1    6/2018
WO     WO 2019187492  A1 *   10/2019   ............. A61B 5/107

OTHER PUBLICATIONS

Bansal, D., et al. "Elderly people fall detection system using skeleton tracking and recognition." American Journal of Applied Sciences 14.9 (2018): 423-431. (Year: 2018).*

* cited by examiner

*FIG. 1*
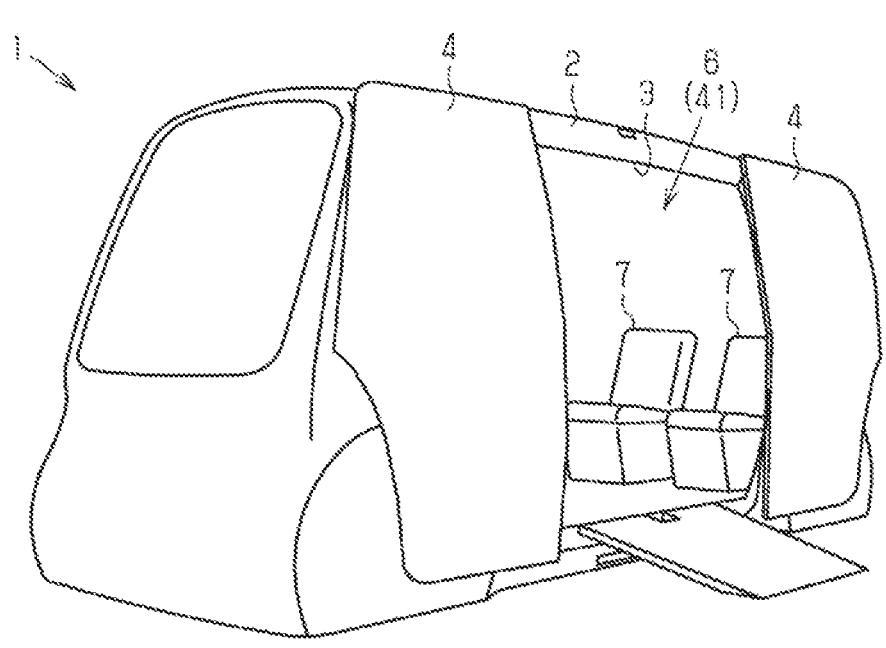
*FIG. 2*
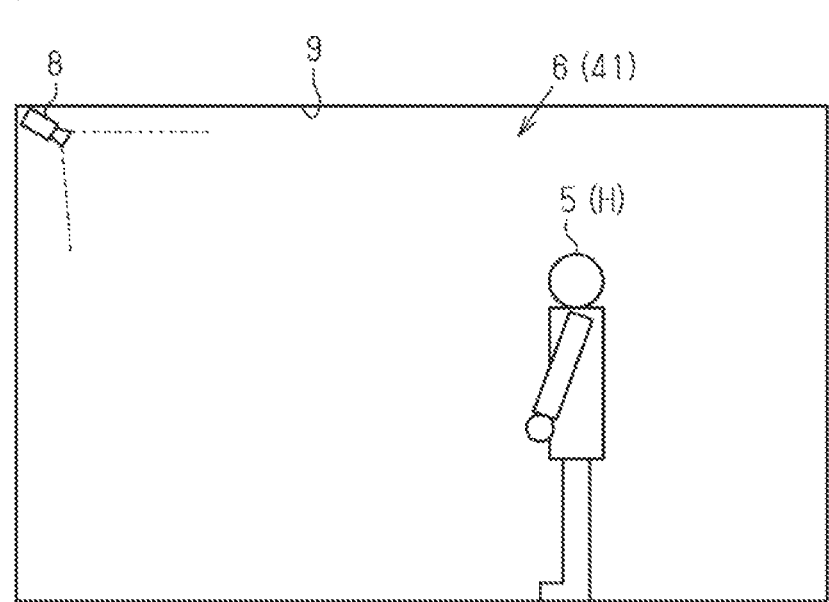

50 — STATE CHANGE DETECTION UNIT 51 (δ) — PIXEL DIFFERENCE VALUE CALCULATION UNIT 52 (X) — HISTORY HOLDING UNIT 53 (Y) — VARIANCE VALUE CALCULATION UNIT 54 (Yth) — STATE CHANGE DETERMINATION UNIT

*FIG. 16*

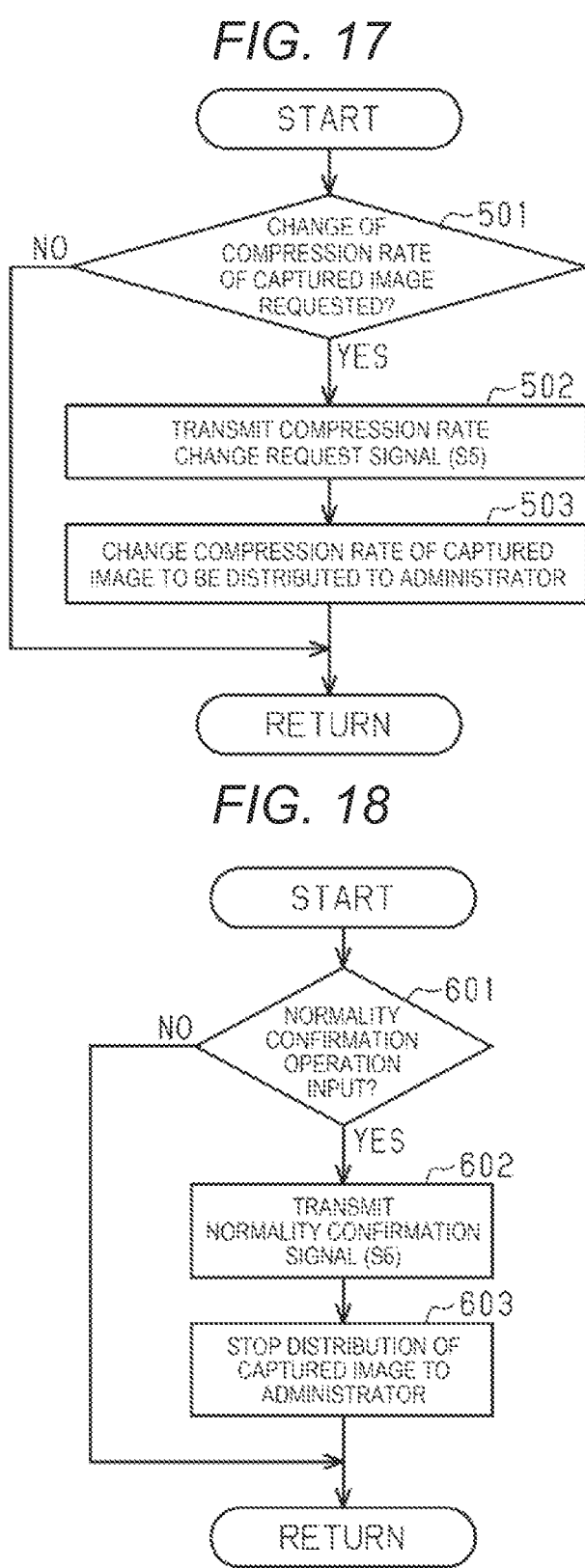

*FIG. 17*

START

CHANGE OF COMPRESSION RATE OF CAPTURED IMAGE REQUESTED? ~501

NO

YES

TRANSMIT COMPRESSION RATE CHANGE REQUEST SIGNAL (S5) ~502

CHANGE COMPRESSION RATE OF CAPTURED IMAGE TO BE DISTRIBUTED TO ADMINISTRATOR ~503

RETURN

*FIG. 18*

START

NORMALITY CONFIRMATION OPERATION INPUT? ~601

NO

YES

TRANSMIT NORMALITY CONFIRMATION SIGNAL (S6) ~602

STOP DISTRIBUTION OF CAPTURED IMAGE TO ADMINISTRATOR ~603

RETURN

*FIG. 19*

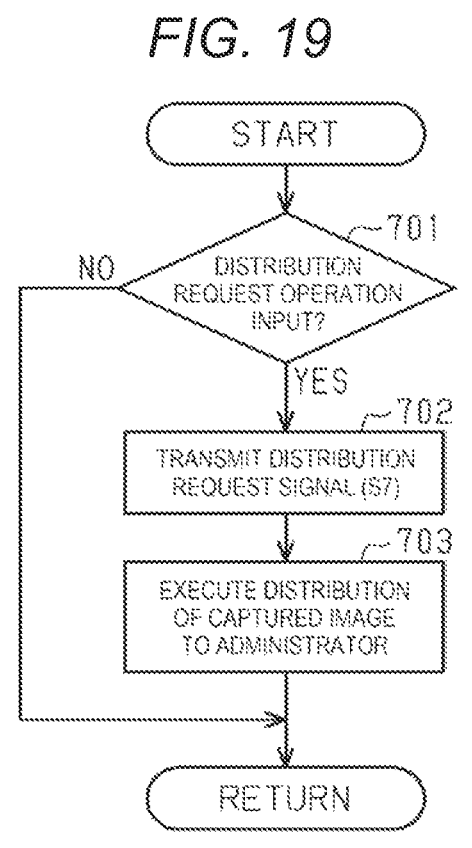

```
        ┌─────────────────┐
        │     START       │
        └────────┬────────┘
                 │
                 ▼
             ╱───────────╲         ~701
    NO   ╱  DISTRIBUTION   ╲
◄───────╱  REQUEST OPERATION ╲
         ╲     INPUT?       ╱
          ╲───────┬────────╱
                  │ YES
                  ▼          ~702
        ┌─────────────────────┐
        │ TRANSMIT DISTRIBUTION│
        │  REQUEST SIGNAL (S7) │
        └──────────┬──────────┘
                   │          ~703
        ┌──────────▼──────────┐
        │ EXECUTE DISTRIBUTION │
        │  OF CAPTURED IMAGE   │
        │  TO ADMINISTRATOR    │
        └──────────┬──────────┘
                   │
                   ▼
        ┌─────────────────┐
        │     RETURN      │
        └─────────────────┘
```

Figure 22:
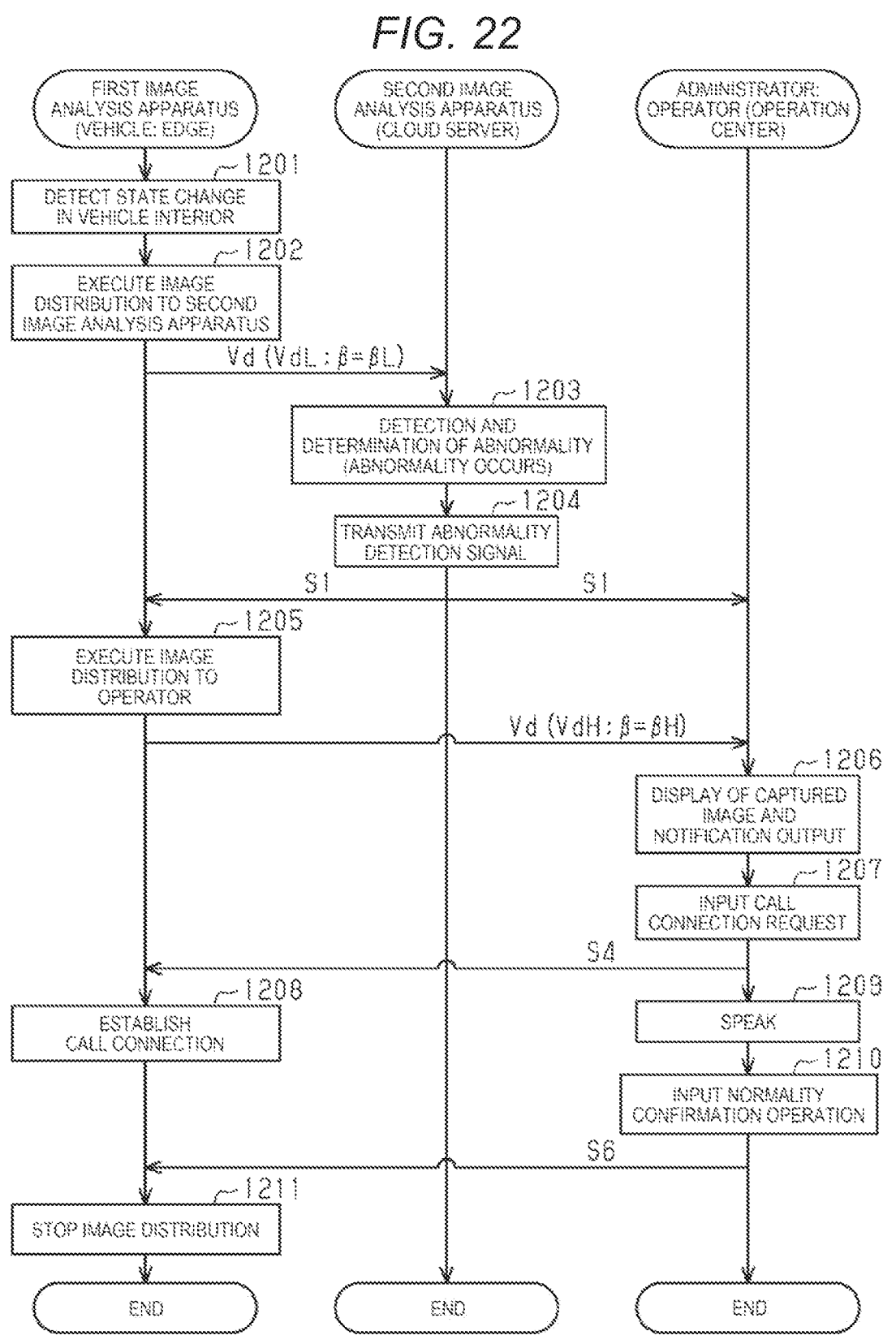

```
┌──────────────────┐   ┌──────────────────┐   ┌──────────────────┐
│   FIRST IMAGE    │   │  SECOND IMAGE    │   │  ADMINISTRATOR:  │
│ANALYSIS APPARATUS│   │ANALYSIS APPARATUS│   │OPERATOR (OPERATION│
│ (VEHICLE: EDGE)  │   │  (CLOUD SERVER)  │   │     CENTER)      │
└──────────────────┘   └──────────────────┘   └──────────────────┘
```

~1201
DETECT STATE CHANGE
IN VEHICLE INTERIOR

~1202
EXECUTE IMAGE
DISTRIBUTION TO SECOND
IMAGE ANALYSIS APPARATUS $Vd\ (VdL : \beta = \beta L)$

~1203
DETECTION AND
DETERMINATION OF ABNORMALITY
(ABNORMALITY OCCURS)

~1204
TRANSMIT ABNORMALITY
DETECTION SIGNAL

S1          S1

~1205
EXECUTE IMAGE
DISTRIBUTION TO
OPERATOR $Vd\ (VdH : \beta = \beta H)$

~1206
DISPLAY OF CAPTURED
IMAGE AND
NOTIFICATION OUTPUT

~1207
INPUT CALL
CONNECTION REQUEST

S4

~1208
ESTABLISH
CALL CONNECTION

~1209
SPEAK

~1210
INPUT NORMALITY
CONFIRMATION OPERATION

S6

~1211
STOP IMAGE DISTRIBUTION

END          END          END

MONITORING SYSTEM FOR MONITORING A SPACE FOR AN ABNORMALITY

CROSS REFERENCE TO RELATED APPLICATIONS

This application is based on and claims priority under 35 U.S.C. § 119 to Japanese Patent Application 2021-100248, filed on Jun. 16, 2021, the entire content of which is incorporated herein by reference.

TECHNICAL FIELD

This disclosure relates to a monitoring system.

BACKGROUND DISCUSSION

In the related art, a monitoring system is known in which a captured image of a monitored space imaged by a camera can be confirmed from an outside through an information communication network. For example, a situation management system for a vehicle described in JP 2012-190072A (Reference 1) includes a plurality of sensors that detect occurrence of a recording event indicating an abnormality of a vehicle. Then, a type of the occurring recording event and a captured image at the time of the occurrence can be confirmed by a mobile phone line.

However, since the related-art technique is configured to detect a state change occurring in the monitored space by using a human presence sensor, a situation and a detection range in which occurrence of the state change can be detected are limited. Therefore, it may be difficult to detect the abnormality with high accuracy via the information communication network.

SUMMARY

According to an aspect of this disclosure, a monitoring system includes: a first image analysis apparatus provided at an edge of an information communication network together with a camera, and configured to analyze a captured image of a monitored space imaged by the camera so as to execute detection and determination of a state change occurring in the monitored space; an image distribution apparatus configured to execute distribution of the captured image via the information communication network when occurrence of the state change is detected; and a second image analysis apparatus configured to analyze the distributed captured image so as to execute detection and determination of an abnormality occurring in the monitored space.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view of a vehicle to which a monitoring system is applied;

FIG. 2 is a diagram illustrating an occupant in a vehicle interior and a camera that captures an image of the occupant;

FIG. 16 is a flowchart showing a processing procedure of display of the captured image distributed to the operator and communication connection based on a request from the operator;

FIG. 17 is a flowchart showing a processing procedure for changing a compression rate of the captured image based on a request from the operator;

FIG. 18 is a flowchart showing a processing procedure for stopping distribution of the captured image based on a normality confirmation operation performed by the operator;

FIG. 19 is a flowchart showing a processing procedure for performing distribution of the captured image based on a request from the operator;

FIG. 21 is a diagram illustrating an action of the monitoring system; and

FIG. 22 is a diagram illustrating an action of the monitoring system.

DETAILED DESCRIPTION

Hereinafter, an embodiment of a monitoring system will be described with reference to drawings.

Figure 3:
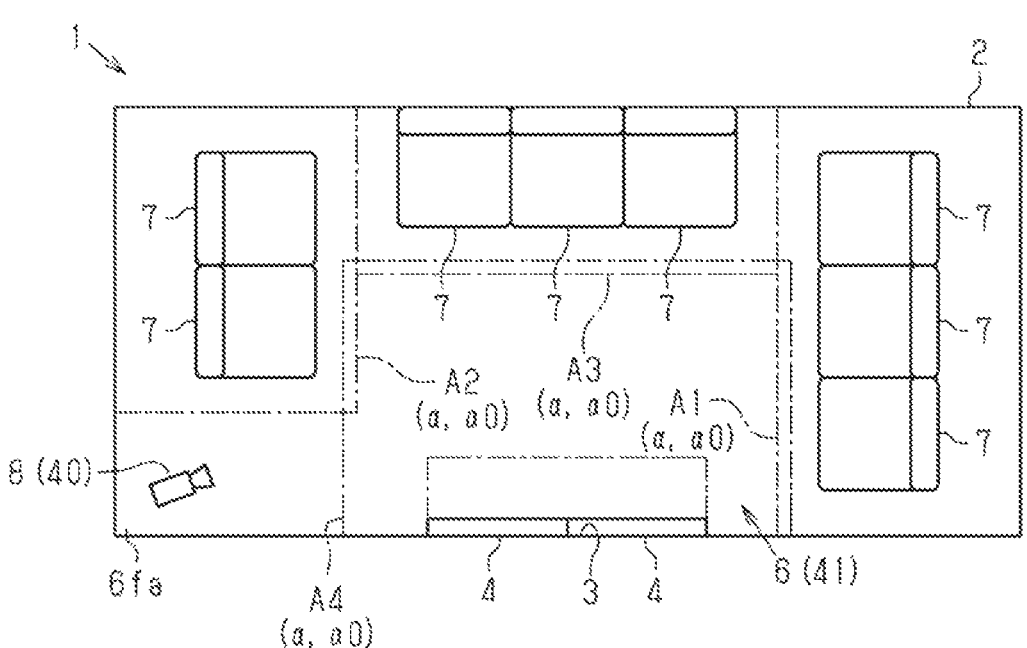
FIG. 3 is a diagram illustrating a case where the vehicle interior is viewed from above.

As shown in FIGS. 1 to 3, a vehicle 1 of the present embodiment includes a vehicle body 2 which extends in a front-rear direction of the vehicle and has a substantially rectangular box shape. A door opening portion 3, which serves as an entrance and exit for an occupant, is provided in a side surface of the vehicle body 2. The door opening portion 3 is provided with a pair of slide doors 4 and 4 that are opened and closed in the front-rear direction of the vehicle and in opposite directions. An occupant 5 in the vehicle 1 is on board the vehicle 1 in a "seating posture" in which the occupant 5 is seated on a seat 7 provided in a vehicle interior 6, or a "standing posture" in which a hanging strap or a handrail (not illustrated) is, for example, used.

Further, a camera 8 that captures an image of an inside of the vehicle interior 6 is provided in the vehicle 1 of the present embodiment. In the vehicle 1 of the present embodiment, the camera 8 is provided in the vicinity of a ceiling portion 9 near a corner portion 6fa at a front position of the vehicle interior 6. As the camera 8, for example, an infrared camera or the like is used. Thus, the camera 8 of the present embodiment is configured to capture an image of the occupant 5 in the vehicle 1 from a predetermined direction set in the vehicle interior 6.

Figure 4:
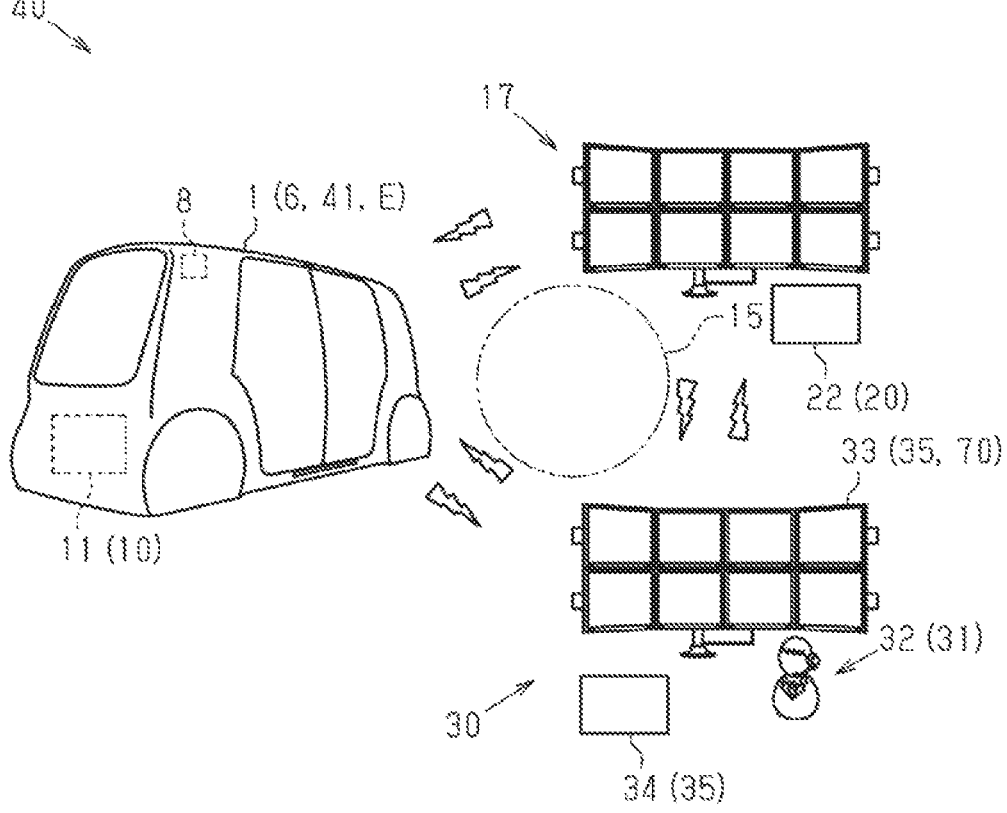
FIG. 4 is a schematic configuration diagram of the monitoring system.
Figure 5:
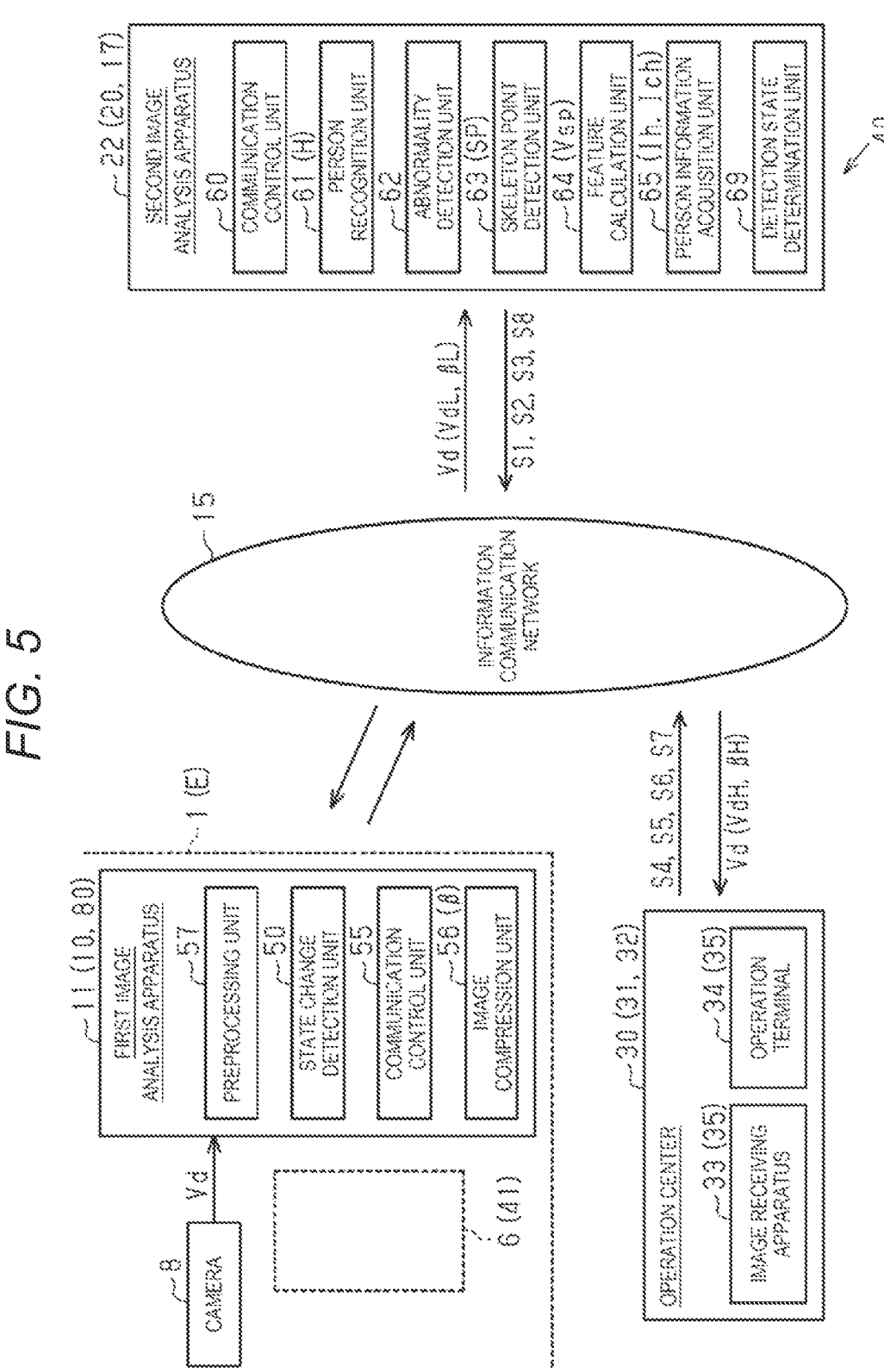
FIG. 5 is a block diagram of the monitoring system.
Figure 6:
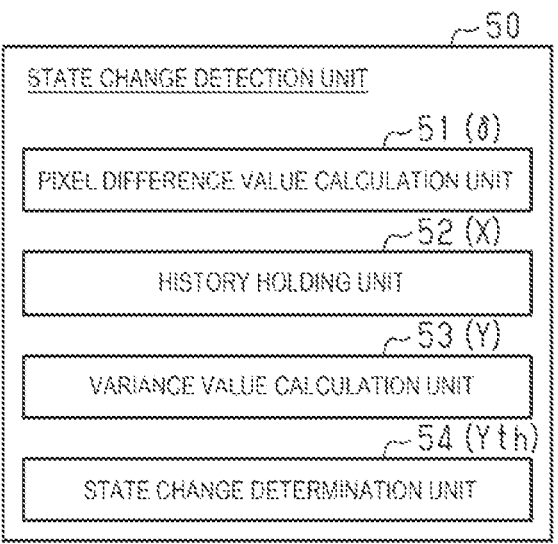
FIG. 6 is a block diagram of a state change detection unit provided in a first image analysis apparatus.

As shown in FIGS. 4 and 5, in the vehicle 1 of the present embodiment, a captured image Vd of the inside of the vehicle interior 6 imaged by the camera 8 is input to a first image analysis apparatus 11 mounted in an in-vehicle information processing apparatus 10. Further, the captured image Vd is distributed, via an information communication network 15, to a second image analysis apparatus 22 mounted in an information processing apparatus 20 that is outside the vehicle and constitutes a cloud server 17, and to an operator 32 as an administrator 31 who stands by in an operation center 30 of the vehicle 1. The information communication network 15 is implemented by a wireless communication network, the Internet, or the like. Further, distribution of the captured image Vd to the operator 32 is performed on an information processing apparatus 35 which constitutes an image receiving apparatus 33 of the captured image Vd and an operation terminal 34 of the operator 32 and is provided in the operation center 30. Thus, in the vehicle 1 of the present embodiment, a multi-layered monitoring system 40 is constructed by the administrator 31, and the first image analysis apparatus 11 and the second image analysis apparatus 22 formed by the information processing apparatuses 10 and 20 which are respectively inside and outside the vehicle and are connected via the information communication network 15.

That is, in the monitoring system 40 of the present embodiment, the vehicle interior 6 of the vehicle 1 imaged by the camera 8 is set as a monitored space 41. Further, the first image analysis apparatus 11 is provided in the vehicle 1 together with the camera 8 so as to monitor the vehicle interior 6 of the vehicle 1 imaged in the captured image Vd at an edge E of the information communication network 15. The monitoring system 40 of the present embodiment is configured such that the second image analysis apparatus 22 and the operator 32 of the operation center 30 monitor, from an outside of the vehicle 1, the captured image Vd of the vehicle interior 6 distributed via the information communication network 15.

(First Image Analysis Apparatus)

First, a configuration and functions of the first image analysis apparatus 11 will be described. As shown in FIG. 5, the first image analysis apparatus 11 of the present embodiment includes a state change detection unit 50 that detects a state change occurring in the vehicle interior 6 of the vehicle 1, which is set as the monitored space 41, by analyzing the captured image Vd of the vehicle interior 6 imaged by the camera 8.

In detail, as shown in FIGS. 6 to 10, the state change detection unit 50 of the present embodiment periodically acquires the captured image Vd of the vehicle interior 6 imaged by the camera 8. The state change detection unit 50 includes a pixel difference value calculation unit 51 that calculates a pixel difference value δ between a previous frame Fb of the captured image Vd acquired in a previous analysis period and a current frame Fc of the captured image Vd acquired in a current analysis period. The state change detection unit 50 further includes: a history holding unit 52 that holds a calculation history X of the calculated pixel difference value δ; and a variance value calculation unit 53 that calculates a variance value Y of the pixel difference value δ based on the calculation history X of the pixel difference value δ held in the history holding unit 52. Further, the state change detection unit 50 of the present embodiment includes a state change determination unit 54 that determines, based on the variance value Y of the pixel difference value δ, the state change occurring in the vehicle interior 6 imaged in the captured image Vd.

That is, a frame F of the captured image Vd acquired by the state change detection unit 50 in each analysis period can be represented by values of respective pixels with a minimum unit for dividing the frame F into a grid pattern as a "pixel". The pixel difference value calculation unit 51 of the present embodiment calculates the pixel difference value δ between the previous frame Fb and the current frame Fc by obtaining a difference between a value in the previous analysis period and a value in the current analysis period for each of the values of these pixels.

Figure 7:
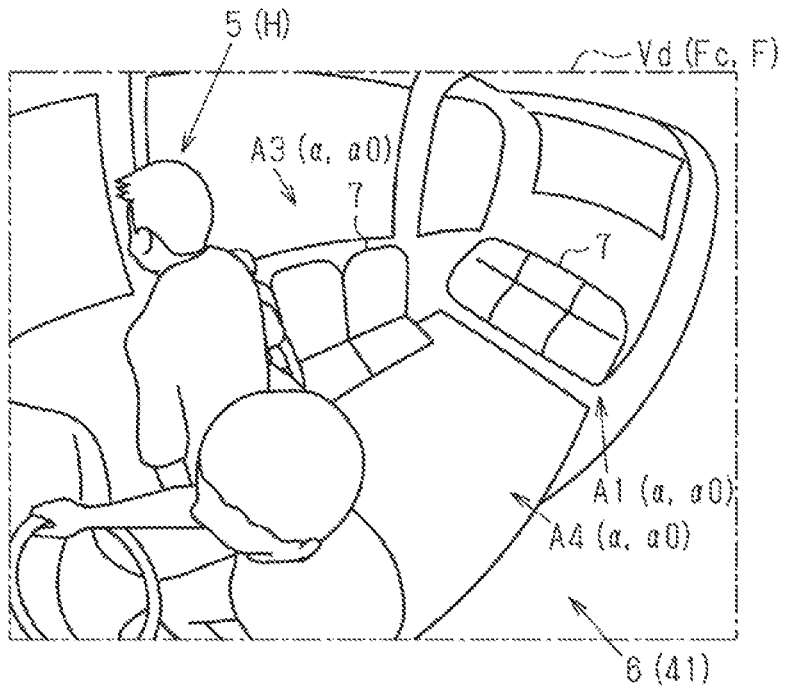
FIG. 7 is an image diagram showing a current frame of a captured image.
Figure 8:
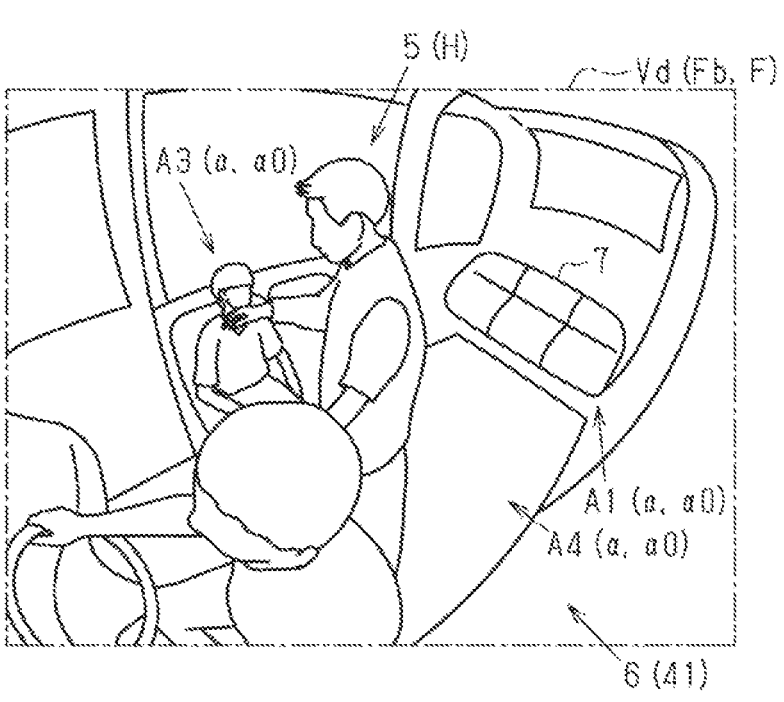
FIG. 8 is an image diagram showing a previous frame of the captured image.
Figure 9:
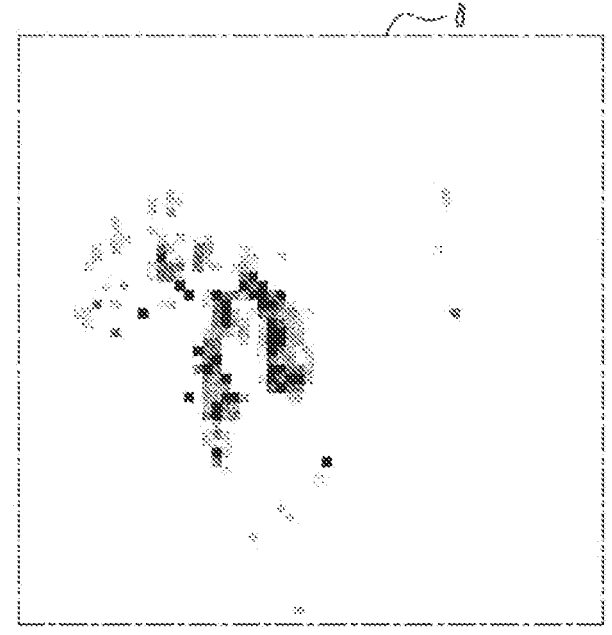
FIG. 9 is an image diagram in which a pixel difference value between the current frame and the previous frame is visualized.

For example, in examples shown in FIGS. 7 to 10, FIG. 7 shows the current frame Fc of the captured image Vd acquired by the state change detection unit 50 in the current analysis period, and FIG. 8 shows the previous frame Fb of the captured image Vd acquired by the state change detection unit 50 in the previous analysis period. In FIG. 9, the pixel difference value δ between the current frame Fc and the previous frame Fb is visualized in a manner of reproducing pixel arrangement in each of these frames F.

That is, when the current frame Fc shown in FIG. 7 is compared with the previous frame Fb shown in FIG. 8, a standing position of the occupant 5 imaged in the captured image Vd changes. A motion of the occupant 5 moving in a floor area A4 is exhibited in the pixel difference value δ shown in FIG. 9.

In addition, the pixel difference value calculation unit 51 of the present embodiment executes calculation of the pixel difference value δ only for a rear seat area A1, a front seat area A2, and an intermediate seat area A3 in which the occupant 5 is on board in the seating posture, and the floor area A4 in which the occupant 5 is on board in the standing posture (see FIG. 3). That is, the pixel difference value calculation unit 51 of the present embodiment sets a boarding area α0 of the occupant 5 set in the vehicle interior 6 as a detection area α set in advance, and does not execute the calculation of the pixel difference value δ, for example, for a vehicle window and the like imaged in the captured image Vd. Thus, in the state change detection unit 50 of the present embodiment, a behavior of the occupant 5 imaged in the captured image Vd is easily exhibited in the pixel difference value δ calculated by the pixel difference value calculation unit 51 as the state change occurring in the vehicle interior 6.

Figures 10, 11:
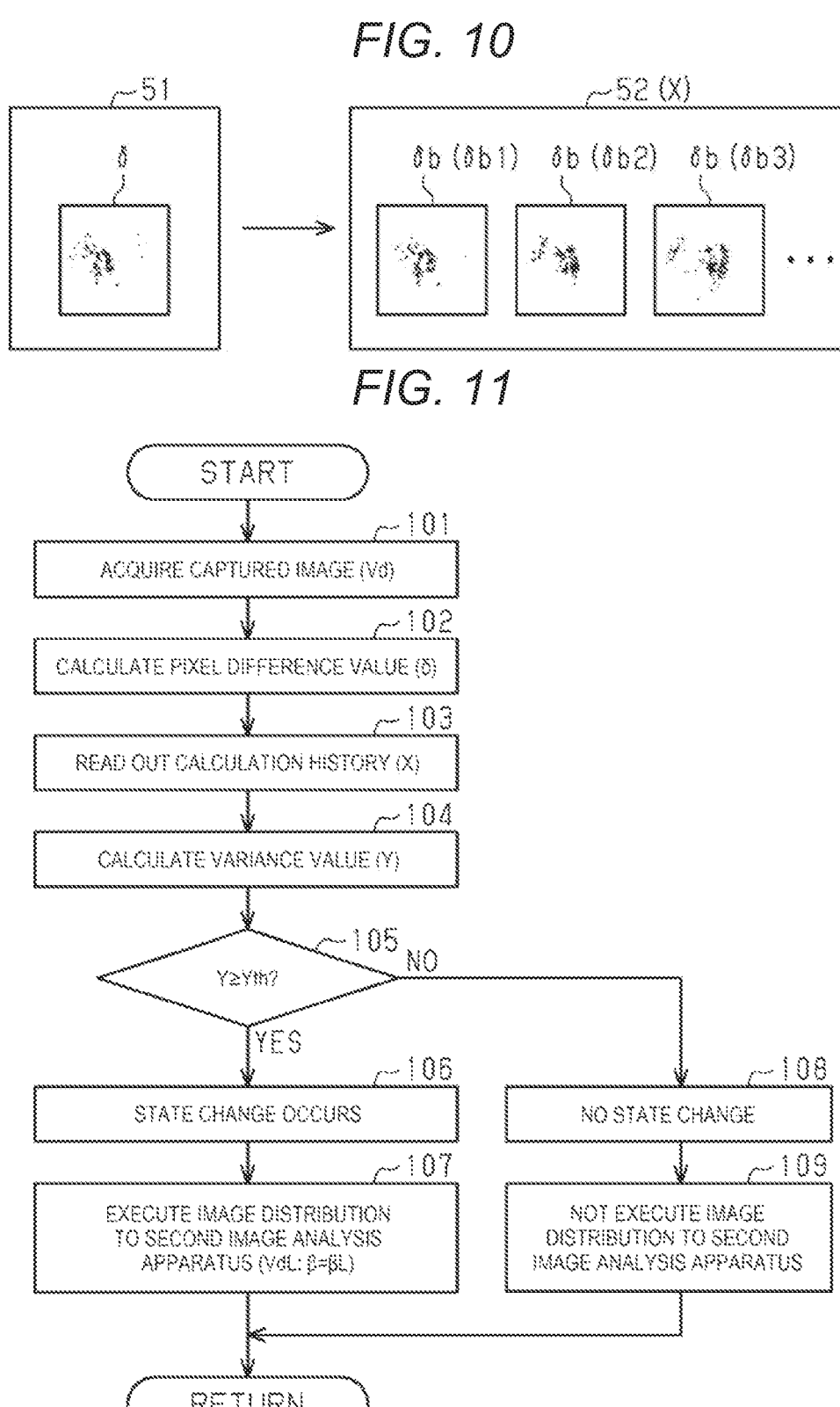
FIG. 10 is an image diagram illustrating a calculation history of the pixel difference value held in a history holding unit and a method for calculating a variance value based on the calculation history.
FIG. 11 is a flowchart showing a processing procedure of detection and determination of a state change and image distribution to a second image analysis apparatus which are performed by the first image analysis apparatus.

In more detail, as shown in FIG. 10, the pixel difference value calculation unit 51 of the present embodiment executes the calculation of the pixel difference value δ in each analysis period in which the state change detection unit 50 acquires the captured image Vd. Further, in the state change detection unit 50 of the present embodiment, a previous value ND of the pixel difference value δ calculated by the pixel difference value calculation unit 51 is held, as the calculation history X of the pixel difference value δ for a past predetermined period determined in advance, in the history holding unit 52. In FIG. 10, a previous value δb1 indicates a previous value δb of the pixel difference value δ calculated in the previous analysis period, and a previous value δb2 indicates a previous value δb of the pixel difference value δ calculated in a second previous analysis period. The state change detection unit 50 of the present embodiment calculates the variance value Y of the pixel difference value δ in each analysis period by reading out the calculation history X of the pixel difference value δ held by the history holding unit 52.

That is, the larger the state change occurring in the vehicle interior 6 imaged in the captured image Vd, the larger a value of the variance value Y of the pixel difference value δ. Further, in the state change detection unit 50 of the present embodiment, the state change determination unit 54 holds a predetermined threshold value Yth determined in advance for the variance value Y of the pixel difference value δ. The state change determination unit 54 of the present embodiment is configured to determine that the state change occurs in the vehicle interior 6 imaged in the captured image Vd when the variance value Y of the pixel difference value δ is equal to or greater than the threshold value Yth (Y≥Yth).

As shown in FIG. 5, the first image analysis apparatus 11 of the present embodiment includes a communication control unit 55 that executes information communication via the information communication network 15. Further, when the state change detection unit 50 detects the occurrence of the state change in the vehicle interior 6 imaged in the captured image Vd, the communication control unit 55 distributes, to the second image analysis apparatus 22, the captured image Vd of the vehicle interior 6 imaged by the camera 8. Thus, the monitoring system 40 of the present embodiment is configured such that monitoring of the vehicle interior 6 based on analysis of the captured image Vd is performed in the second image analysis apparatus 22 disposed outside the vehicle 1.

That is, as shown in FIG. 11, in the first image analysis apparatus 11 of the present embodiment, the state change detection unit 50 acquires the captured image Vd of the vehicle interior 6 in each predetermined analysis period (step 101). Next, the state change detection unit 50 calculates the pixel difference value δ between the previous frame Fb of the captured image Vd acquired in the previous analysis period and the current frame Fc of the captured image Vd acquired in the current analysis period (step 102). Next, the state change detection unit 50 reads out the calculation history X of the pixel difference value δ calculated in a past analysis period (step 103), and calculates the variance value Y of the pixel difference value δ (step 104). Further, when the variance value Y of the pixel difference value δ is equal to or greater than the threshold value Yth (Y≥Yth, YES in step 105), the state change detection unit 50 determines that the state change occurs in the vehicle interior 6 imaged in the captured image Vd (step 106). Thus, the first image analysis apparatus 11 of the present embodiment is configured such that the communication control unit 55 starts distribution of the captured image Vd to the second image analysis apparatus 22 (step 107).

In the state change detection unit 50 of the present embodiment, the calculation history X of the pixel difference value δ held by the history holding unit 52 is sequentially updated by using a new pixel difference value δ calculated by the pixel difference value calculation unit 51 as a latest previous value Ob. When the variance value Y of the pixel difference value δ is smaller than the threshold value Yth (Y<Yth, NO in step 105), the state change determination unit 54 determines that the state change to be detected by the state change detection unit 50 does not occur in the vehicle interior 6 imaged in the captured image Vd (step 108). The first image analysis apparatus 11 of the present embodiment is configured such that the communication control unit 55 does not execute the distribution of the captured image Vd to the second image analysis apparatus 22 in this case (step 109).

In more detail, as shown in FIG. 5, the first image analysis apparatus 11 of the present embodiment is provided with an image compression unit 56 that compresses the captured image Vd of the vehicle interior 6 imaged by the camera 8. The first image analysis apparatus 11 of the present embodiment distributes a captured image VdL compressed by the image compression unit 56 to the second image analysis apparatus 22 to which the first image analysis apparatus 11 is connected via the information communication network 15.

Specifically, in the first image analysis apparatus 11 of the present embodiment, the image compression unit 56 compresses, at a predetermined compression rate βL (β=βL), the captured image Vd of the vehicle interior 6 which is to be distributed to the second image analysis apparatus 22. Thus, the monitoring system 40 is configured such that a communication load resulting from the distribution of the captured image Vd via the information communication network 15 can be reduced.

Further, the first image analysis apparatus 11 of the present embodiment is provided with a preprocessing unit 57 that performs preprocessing of the captured image Vd input to the first image analysis apparatus 11. Specifically, in the first image analysis apparatus 11 of the present embodiment, the preprocessing unit 57 executes removal of noise included in the captured image Vd, luminance adjustment and smoothing of pixels constituting the captured image Vd, and the like. Thus, the first image analysis apparatus 11 of the present embodiment is configured such that an influence of so-called reflection, disturbance light, or the like on the captured image Vd can be reduced.

(Second Image Analysis Apparatus)

Next, a configuration and functions of the second image analysis apparatus 22 will be described.

As shown in FIG. 5, in the monitoring system 40 of the present embodiment, the second image analysis apparatus 22 includes a communication control unit 60 that has a function of receiving the captured image Vd of the vehicle interior 6 distributed by the first image analysis apparatus 11 as described above. The second image analysis apparatus 22 of the present embodiment has a function of analyzing the received captured image Vd to execute detection and determination of an abnormality occurring in the vehicle interior 6 of the vehicle 1.

In detail, the second image analysis apparatus 22 of the present embodiment includes a person recognition unit 61 that recognizes a person H in the vehicle interior 6 imaged in the captured image Vd, that is, the occupant 5 in the vehicle 1. In the second image analysis apparatus 22 of the present embodiment, the person recognition unit 61 executes recognition processing for the person H by using an inference model generated by machine learning. Further, the second image analysis apparatus 22 of the present embodiment includes an abnormality detection unit 62 that detects the abnormality occurring in the vehicle interior 6 imaged by the camera 8 by monitoring the occupant 5 in the vehicle 1 thus recognized.

Figure 12:
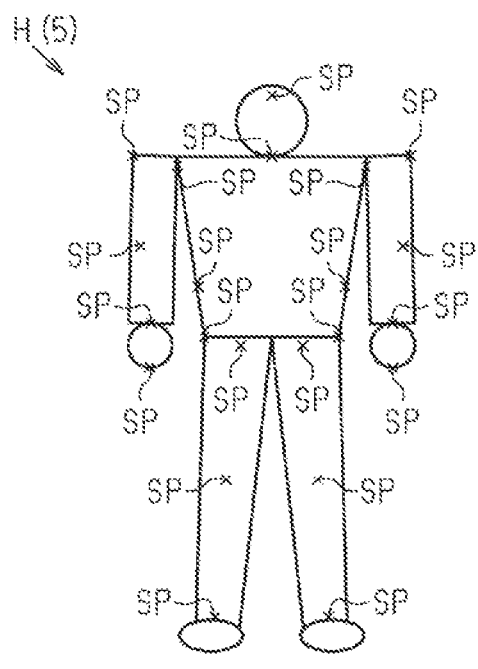
FIG. 12 is a diagram illustrating skeleton points of a person.

Specifically, as shown in FIGS. 5 and 12, the second image analysis apparatus 22 of the present embodiment includes a skeleton point detection unit 63 that detects skeleton points SP of the person H included in the captured image Vd. That is, the skeleton points SP are unique points that characterize a body of the person H, such as joints and points on a body surface, and correspond to, for example, a head, a neck, shoulders, armpits, elbows, wrists, hand tips, a waist, a hip joint, buttocks, knees, ankles, and the like. Further, in the second image analysis apparatus 22 of the present embodiment, the skeleton point detection unit 63 also executes detection processing of the skeleton points SP by using an inference model generated by machine learning.

As shown in FIG. 5, the second image analysis apparatus 22 of the present embodiment includes a feature calculation unit 64 that calculates a feature Vsp based on detection of the skeleton points SP. Specifically, in the second image analysis apparatus 22 of the present embodiment, the feature calculation unit 64 calculates the feature Vsp of the person H imaged in the captured image Vd based on positions of the skeleton points SP on two-dimensional coordinates in the captured image Vd. Further, the feature calculation unit 64 calculates the feature Vsp of the person H imaged in the captured image Vd based on, for example, a body size indicated by the plurality of skeleton points SP, such as a shoulder width of the occupant 5. Further, the second image analysis apparatus 22 of the present embodiment includes a person information acquisition unit 65 that acquires, based on the feature Vsp of the person H obtained by a series of analysis processing, information Ih of the person H recognized in the monitored space 41 imaged by the camera 8.

Figure 13:
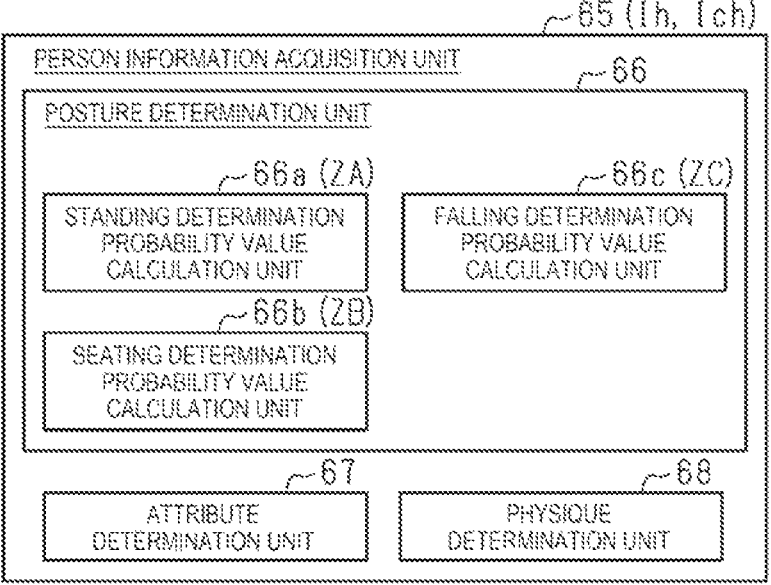
FIG. 13 is a block diagram of a person information acquisition unit provided in the second image analysis apparatus.

In detail, as shown in FIG. 13, the person information acquisition unit 65 of the present embodiment includes a posture determination unit 66 that determines a posture of the person H imaged in the captured image Vd. The posture determination unit 66 of the present embodiment inputs the feature Vsp of the person H acquired from the feature calculation unit 64 to an inference model generated by machine learning. Then, the posture determination unit 66 determines the posture of the person H imaged in the captured image Vd of the inside of the vehicle interior 6 based on a posture determination probability value thus obtained.

Specifically, the posture determination unit 66 of the present embodiment includes a standing determination probability value calculation unit 66a that calculates a probability that a posture of the occupant 5 as a posture determination target person is the "standing posture". In addition, the posture determination unit 66 includes a seating determination probability value calculation unit 66b that calculates a probability that the posture of the occupant 5 as the target person is the "seating posture". Further, the posture determination unit 66 of the present embodiment includes a falling determination probability value calculation unit 66c that calculates a probability that the posture of the occupant 5 as the target person is a "falling posture".

That is, in the posture determination unit 66 of the present embodiment, as the posture determination probability value, the standing determination probability value calculation unit 66a calculates a standing determination probability value ZA, the seating determination probability value calculation unit 66b calculates a seating determination probability value ZB, and the falling determination probability value calculation unit 66c calculates a falling determination probability value ZC. Further, the posture determination unit 66 of the present embodiment executes calculation of the posture determination probability value such that a total value of the standing determination probability value ZA, the seating determination probability value ZB, and the falling determination probability value ZC is "1.0". Thus, the posture determination unit 66 of the present embodiment can determine the posture of the occupant 5 without contradiction based on the posture determination probability value.

The standing determination probability value ZA calculated by the standing determination probability value calculation unit 66a of the present embodiment is further divided into a probability that the occupant 5 in the "standing posture" is in a "moving state", a probability that the occupant 5 is in a "still state", and a probability that the occupant 5 is in a "state in which the hanging strap, the handrail, or the like is used". Thus, the posture determination unit 66 of the present embodiment can subdivide and determine the "standing posture".

In the second image analysis apparatus 22 of the present embodiment, the person information acquisition unit 65 is provided with an attribute determination unit 67 that determines an attribute of the person H imaged in the captured image Vd, a physique determination unit 68 that determines a physique of the person H, and the like, in addition to the posture determination unit 66. Thus, the second image analysis apparatus 22 of the present embodiment can detect, with high accuracy, a state of the person H imaged in the captured image Vd.

As shown in FIGS. 5 and 13, when the posture determination unit 66 provided in the person information acquisition unit 65 determines that the occupant 5 in the vehicle 1 falls down, the abnormality detection unit 62 of the present embodiment determines that the abnormality occurs in the vehicle interior 6 imaged in the captured image Vd of the camera 8. Further, in this case, the second image analysis apparatus 22 of the present embodiment transmits, to the vehicle 1 and the operation center 30, a notification that occurrence of the abnormality is detected. In the second image analysis apparatus 22 of the present embodiment, transmission of an abnormality detection signal S1 for notifying detection of the occurrence of the abnormality is executed by the communication control unit 60. Thus, the monitoring system 40 of the present embodiment is configured such that the operator 32 who stands by in the operation center 30 of the vehicle 1 can quickly cope with the abnormality occurring in the vehicle interior 6.

As shown in FIG. 5, the second image analysis apparatus 22 of the present embodiment includes a detection state determination unit 69 that determines a detection state of the skeleton points SP detected by the skeleton point detection unit 63. Specifically, in the second image analysis apparatus 22 of the present embodiment, the detection state determination unit 69 determines whether the skeleton points SP can be detected based on the analysis of the captured image Vd in the skeleton point detection unit 63. In addition, the detection state determination unit 69 determines whether main skeleton points SP, which are used for the information Ih of the person H imaged in the captured image Vd, that is, occupant information Ich, in such as determination of the posture described above, can be stably detected. Further, in the second image analysis apparatus 22 of the present embodiment, when the detection state determination unit 69 determines that the skeleton points SP cannot be detected, a notification of the result is transmitted to the vehicle 1 and the operation center 30. The second image analysis apparatus 22 of the present embodiment also transmits a notification of a result to the vehicle 1 and the operation center 30 when the detection state determination unit 69 determines that the skeleton point detection unit 63 is in a state in which the skeleton points SP cannot be stably detected and detection accuracy decreases.

That is, due to an influence of a light source, a positional relationship with the camera 8, or the like, the skeleton point detection unit 63 may be in the state in which the skeleton points SP cannot be detected based on the analysis of the captured image Vd or the detection accuracy decreases. In view of the above description, the second image analysis apparatus 22 of the present embodiment is provided with the detection state determination unit 69. In the second image analysis apparatus 22 of the present embodiment, transmission of a detection impossible signal S2 for notifying that these skeleton points SP cannot be detected and a detection accuracy decrease signal S3 for notifying that the detection accuracy decreases is also executed by the communication control unit 60. Thus, in the monitoring system 40 of the present embodiment, the operator 32 standing by in the operation center 30 can quickly grasp a situation based on a detection impossible notification and a detection accuracy decrease notification for the skeleton points SP issued by the second image analysis apparatus 22. That is, it is possible to recognize a fact that a situation occurs in which it is determined that the abnormality cannot be detected by the second image analysis apparatus 22 or the accuracy for the detection and determination decreases.

In the monitoring system 40 of the present embodiment, as described above, when the abnormality occurring in the vehicle interior 6 is detected by the second image analysis apparatus 22, the captured image Vd of the inside of the vehicle interior 6 imaged by the camera 8 is distributed to the operator 32 who stands by in the operation center 30. Further, in the monitoring system 40 of the present embodiment, when the situation occurs in which it is determined that the abnormality cannot be detected by the second image analysis apparatus 22 or the accuracy for the detection and determination decreases, the distribution of the captured image Vd to the operator 32 is also executed. Thus, the monitoring system 40 of the present embodiment is configured such that the operator 32 as the administrator 31 can confirm the captured image Vd of the inside of the vehicle interior 6 by using the image receiving apparatus 33 provided in the operation center 30.

Figure 14:
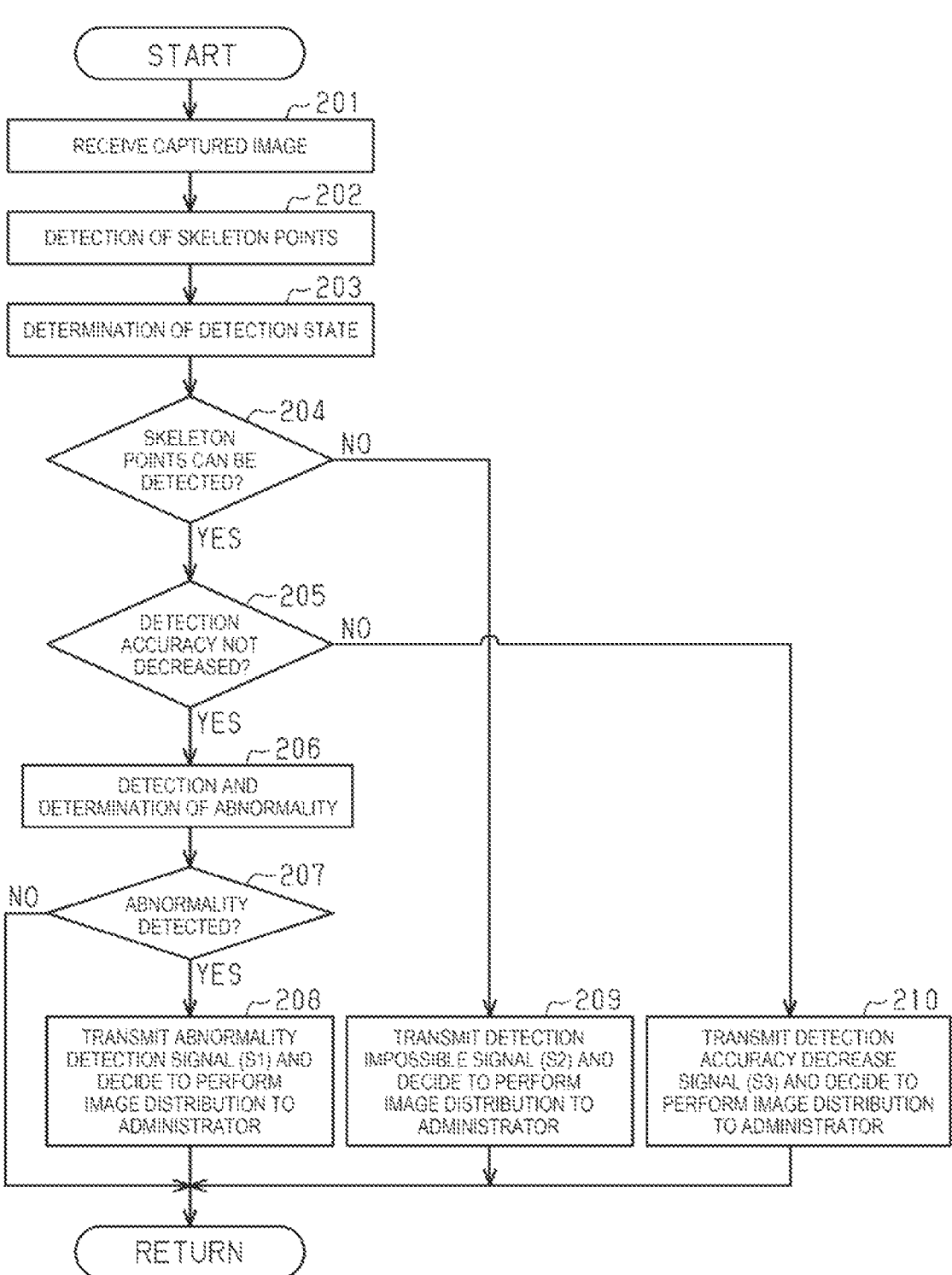
FIG. 14 is a flowchart showing a processing procedure of detection and determination of an abnormality and determination of a detection state of the skeleton points which are performed by the second image analysis apparatus.

That is, as shown in FIG. 14, when the second image analysis apparatus 22 of the present embodiment receives the captured image Vd of the vehicle interior 6 distributed by the first image analysis apparatus 11 (step 201), the second image analysis apparatus 22 executes detection of skeleton points SP of the occupant 5 included in the captured image Vd (step 202). Then, the second image analysis apparatus 22 executes determination of the detection state of the skeleton points SP in step 202 (step 203).

Next, the second image analysis apparatus 22 determines whether the skeleton points SP can be detected based on a result of the determination of the detection state in step 203 (step 204). Then, when it is determined in step 204 that the skeleton points SP can be detected (YES in step 204), the second image analysis apparatus 22 subsequently determines whether the skeleton point detection unit 63 is not in the state in which the detection accuracy for the skeleton points SP decreases (step 205).

Further, when it is determined in step 205 that the skeleton point detection unit 63 is not in the state in which the detection accuracy for the skeleton points SP decreases (YES in step 205), the second image analysis apparatus 22 of the present embodiment executes detection and determination of the abnormality based on the detection of the skeleton points SP (step 206). Then, when the abnormality occurring in the vehicle interior 6 imaged in the captured image Vd is detected in the detection and determination of the abnormality (YES in step 207), the second image analysis apparatus 22 executes transmission of the abnormality detection signal S1, and decides to perform distribution of the captured image Vd to the administrator 31 (step 208).

When it is determined in step 204 that the skeleton points SP cannot be detected (NO in step 204), the second image analysis apparatus 22 of the present embodiment executes the transmission of the detection impossible signal S2 indicating the result (step 209). Further, when it is determined in step 205 that the detection accuracy for the skeleton points SP decreases (NO in step 205), the second image analysis apparatus 22 executes the transmission of the detection accuracy decrease signal S3 indicating the result (step 210). The second image analysis apparatus 22 of the present embodiment also decides to perform the distribution of the captured image Vd to the operator 32 as the administrator 31 in these cases (step 209 and step 210).

(Distribution Control for Captured Image)

Next, distribution control for the captured image Vd in the monitoring system 40 of the present embodiment will be described.

As shown in FIGS. 4 and 5, in the monitoring system 40 of the present embodiment, the distribution of the captured image Vd to the operator 32 as the administrator 31 is executed by the first image analysis apparatus 11 provided in the vehicle 1 together with the camera 8.

Figure 15:
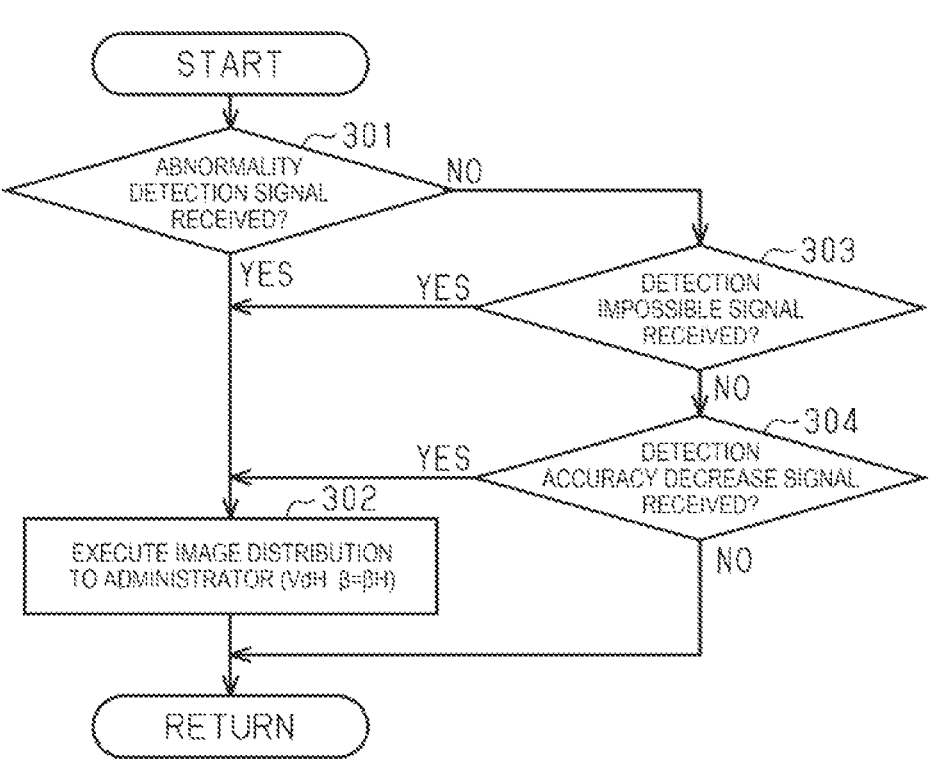
FIG. 15 is a flowchart showing a processing procedure of image distribution to an operator performed by the first image analysis apparatus.

Specifically, as shown in FIG. 15, the first image analysis apparatus 11 of the present embodiment determines whether the abnormality detection signal 51 transmitted by the second image analysis apparatus 22 is received (step 301). Then, when the first image analysis apparatus 11 receives the abnormality detection signal 51 (YES in step 301), the first image analysis apparatus 11 starts the distribution of the captured image Vd to the operator 32 of the operation center 30 (step 302).

In addition, the first image analysis apparatus 11 determines whether the detection impossible signal S2 transmitted by the second image analysis apparatus 22 is received (step 303). Then, when the first image analysis apparatus 11 receives the detection impossible signal S2 (YES in step 303), the first image analysis apparatus 11 also starts the distribution of the captured image Vd to the operator 32 of the operation center 30 by executing step 302 described above.

Further, the first image analysis apparatus 11 determines whether the detection accuracy decrease signal S3 transmitted by the second image analysis apparatus 22 is received (step 304). Then, when the first image analysis apparatus 11 receives the detection accuracy decrease signal S3 (YES in step 304), the first image analysis apparatus 11 also starts the distribution of the captured image Vd to the operator 32 of the operation center 30 by executing step 302 described above.

In the first image analysis apparatus 11 of the present embodiment, at this time, the image compression unit 56 compresses the captured image Vd of the vehicle interior 6 imaged by the camera 8 at a compression rate βH higher than the compression rate βL of the captured image VdL distributed to the second image analysis apparatus 22 (βH>βL). The monitoring system 40 of the present embodiment is configured such that a captured image VdH of the vehicle interior 6 having the high compression rate βH is distributed, via the information communication network 15, to the operator 32 who stands by in the operation center 30.

That is, even when the captured image Vd having a high compression rate has a low resolution, in many cases, a situation in the vehicle interior 6 imaged in the captured image Vd can be grasped without any problem by confirming the captured image Vd with eyes of a person, that is, by the operator 32 as the administrator 31. In view of the above description, in the monitoring system 40 of the present embodiment, the captured image VdH having the high compression rate βH is distributed to the operator 32 of the operation center 30 as described above. Thus, the monitoring system 40 of the present embodiment is configured such that the communication load resulting from the distribution of the captured image Vd via the information communication network 15 can be reduced.

In more detail, the monitoring system 40 of the present embodiment is configured such that the operator 32 of the operation center 30 can operate the operation terminal 34 so as to cope with the situation of the vehicle interior 6 while confirming the captured image Vd of the vehicle interior 6 in the image receiving apparatus 33. Specifically, in the monitoring system 40 of the present embodiment, the operator 32 of the operation center 30 can make a call with the occupant 5 in the vehicle interior 6 via the information communication network 15 by operating the operation terminal 34. Thus, the monitoring system 40 of the present embodiment is configured such that, for example, the operator 32 can cope with the situation of the vehicle interior 6 by such as speaking with the occupant 5 falling down in the vehicle interior 6.

Figure 16:
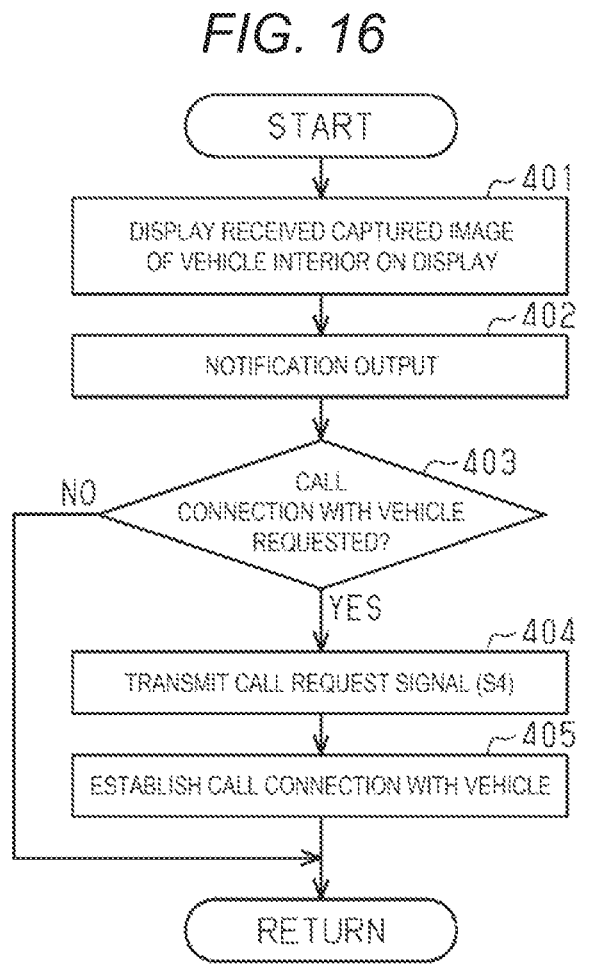

Specifically, as shown in FIG. 16, in the monitoring system 40 of the present embodiment, the information processing apparatus 35 of the operation center 30 constituting the image receiving apparatus 33 displays, on a display 70, the captured image Vd of the vehicle interior 6 received from the vehicle 1 (see FIG. 4, step 401). At this time, the information processing apparatus 35 of the present embodiment also executes notification output for a content that is indicated by the abnormality detection signal 51, the detection impossible signal S2, or the detection accuracy decrease signal S3 received from the second image analysis apparatus 22 (step 402).

Further, the information processing apparatus 35 serving as the operation terminal 34 determines whether an operation of requesting a call connection with the vehicle 1 is input (step 403). Further, when the information processing apparatus 35 detects a call request to the vehicle 1 by the operator 32 (YES in step 403), the information processing apparatus 35 transmits, to the information processing apparatus 10 mounted in the vehicle 1, a call request signal S4 to request the call connection (step 404). Thus, the monitoring system 40 of the present embodiment is configured to establish the call connection between the vehicle 1 and the operation center 30 via the information communication network 15 (step 405).

In the monitoring system 40 of the present embodiment, by operating the operation terminal 34 of the operation center 30, a compression rate β of the captured image Vd to be distributed to the operator 32 can be changed in response to a request from the operator 32 who is the administrator 31. For example, when it is difficult to confirm the situation of the vehicle interior 6 from the captured image VdH having the high compression rate βH, the operator 32 can operate the operation terminal 34 to lower the compression rate β of the captured image VdH from the compression rate βH that is an initial value. Thus, the monitoring system 40 of the present embodiment is configured such that the operator 32 of the operation center 30 can confirm the captured image Vd of the vehicle interior 6 at a higher resolution.

Specifically, as shown in FIG. 17, the information processing apparatus 35 serving as the operation terminal 34 determines whether an operation of requesting to change the compression rate β of the captured image Vd is input (step

501). Further, when the information processing apparatus 35 detects a request from the operator 32 to change the compression rate β of the captured image Vd (YES in step 501), the information processing apparatus 35 transmits a compression rate change request signal S5 to the first image analysis apparatus 11 in the vehicle 1 (step 502). In the monitoring system 40 of the present embodiment, either an operation of lowering the compression rate β of the captured image Vd or an operation of increasing the compression rate β of the captured image Vd can be input to the operation terminal 34 of the operation center 30. Then, the monitoring system 40 of the present embodiment is configured such that when the first image analysis apparatus 11 receives the compression rate change request signal S5, the compression rate β of the captured image Vd to be distributed to the operator 32 is changed (step 503).

In the monitoring system 40 of the present embodiment, when it is confirmed that no abnormality occurs in the vehicle interior 6 of the vehicle 1 imaged in the captured image Vd, the operator 32 inputs a normality confirmation operation to the operation terminal 34. The monitoring system 40 of the present embodiment is configured such that the distribution of the captured image Vd to the operator 32 as the administrator 31 is stopped based on an input of the normality confirmation operation.

Specifically, as shown in FIG. 18, the information processing apparatus 35 serving as the operation terminal 34 determines whether the normality confirmation operation indicating that no abnormality occurs in the vehicle interior 6 of the vehicle 1 imaged in the captured image Vd is input (step 601). Further, when the information processing apparatus 35 detects the input of the normality confirmation operation performed by the operator 32 (YES in step 601), the information processing apparatus 35 transmits, to the first image analysis apparatus 11 in the vehicle 1, a normality confirmation signal S6 for notifying that no abnormality occurs in the vehicle interior 6 (step 602). The monitoring system 40 of the present embodiment is configured to, when the first image analysis apparatus 11 receives the normality confirmation signal S6, stop the distribution of the captured image Vd to the operator 32 (step 603).

In the monitoring system 40 of the present embodiment, even when the distribution of the captured image Vd to the operator 32 is not performed, the distribution of the captured image Vd to the operator 32 is performed by the operator 32 operating the operation terminal 34.

Specifically, as shown in FIG. 19, the information processing apparatus 35 serving as the operation terminal 34 determines whether an operation of requesting the distribution of the captured image Vd is input (step 701). Further, when the information processing apparatus 35 detects an input of the distribution request operation performed by the operator 32 (YES in step 701), the information processing apparatus 35 transmits, to the first image analysis apparatus 11 in the vehicle 1, a distribution request signal S7 based on the input of the distribution request operation (step 702). The monitoring system 40 of the present embodiment is configured to, when the first image analysis apparatus 11 receives the distribution request signal S7, start the distribution of the captured image Vd to the operator 32 (step 703).

Further, in the monitoring system 40 of the present embodiment, the second image analysis apparatus 22 also executes normality confirmation and determination for confirming and determining that no abnormality occurs in the vehicle interior 6 imaged in the captured image Vd. The normality confirmation and determination performed by the second image analysis apparatus 22 is performed, for example, by determining whether a state in which the abnormality occurring in the vehicle interior 6 imaged in the captured image Vd is not detected continues for a predetermined time in the detection and determination of the abnormality (see FIG. 14, NO in step 207). The monitoring system 40 of the present embodiment is configured to stop, based on the normality confirmation and determination, the distribution of the captured image Vd to the second image analysis apparatus 22 mounted in the information processing apparatus 20 that is outside the vehicle and constitutes the cloud server 17.

Figure 20:
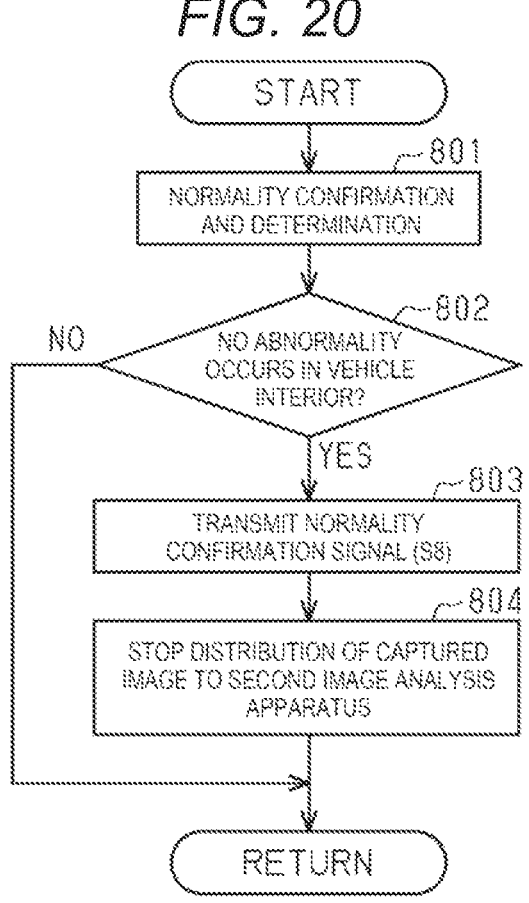
FIG. 20 is a flowchart showing a processing procedure for stopping the distribution of the captured image based on normality confirmation and determination performed by the second image analysis apparatus.

That is, as shown in FIG. 20, when the second image analysis apparatus 22 of the present embodiment executes the normality confirmation and determination (step 801), the second image analysis apparatus 22 determines in the normality confirmation and determination whether it is confirmed that no abnormality occurs in the vehicle interior 6 imaged in the captured image Vd (step 802). Further, when it is confirmed that no abnormality occurs in the vehicle interior 6 imaged in the captured image Vd (YES in step 802), the second image analysis apparatus 22 transmits, to the first image analysis apparatus 11 in the vehicle 1, a normality confirmation signal S8 for notifying that no abnormality occurs in the vehicle interior 6 (step 803). Then, the monitoring system 40 of the present embodiment is configured to, when the first image analysis apparatus 11 receives the normality confirmation signal S8, stop the distribution of the captured image Vd to the second image analysis apparatus 22 (step 803).

Next, an action of the monitoring system 40 of the present embodiment configured as described above will be described.

Figure 21:
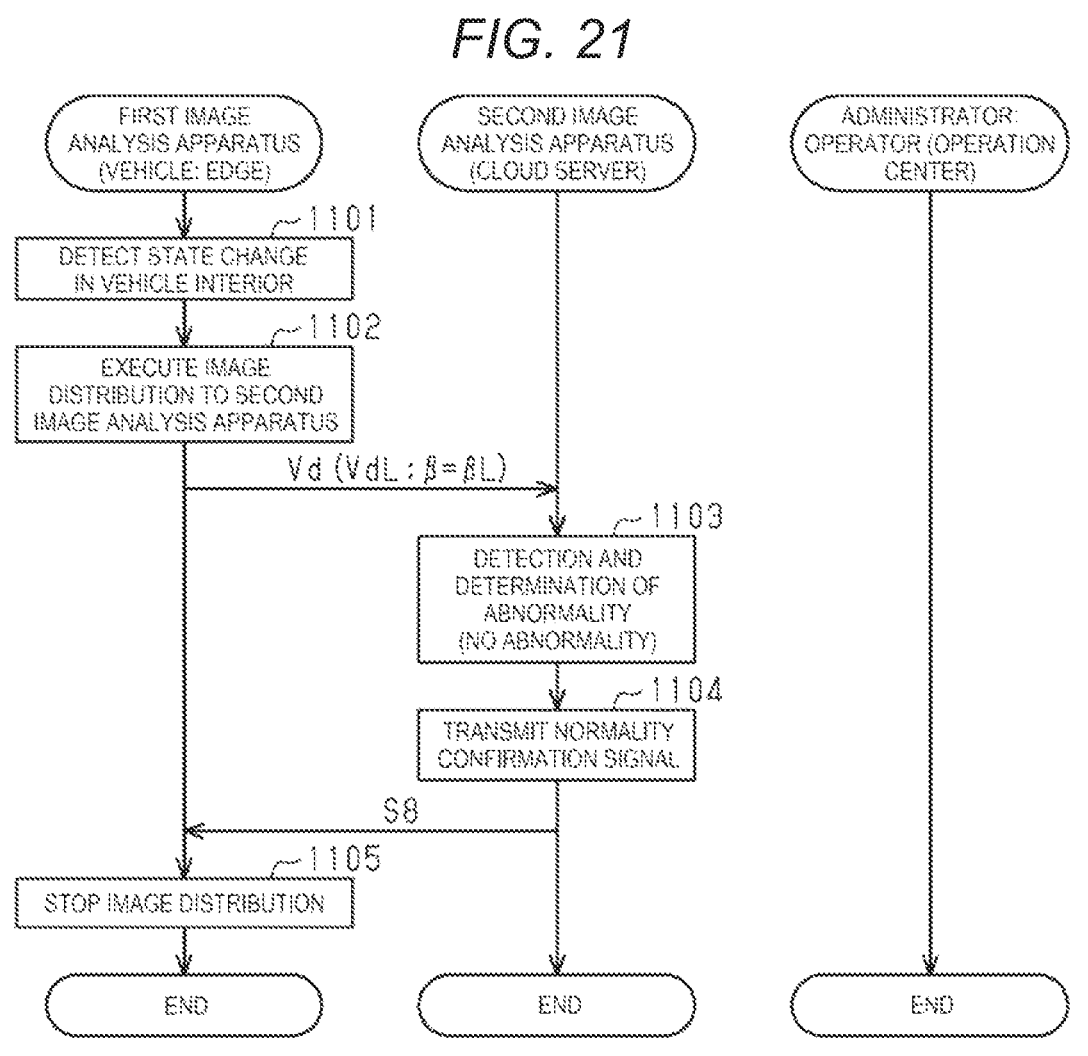

FIG. 21 is an example of a case in which the state change occurring in the vehicle interior 6 imaged in the captured image Vd of the camera 8 is an event in a category determined to be "no abnormality", that is, "normality".

In this case, first, the first image analysis apparatus 11 provided together with the camera 8 in the vehicle 1 detects the state change occurring in the vehicle interior 6 (step 1101). Then, based on detection of the state change, the first image analysis apparatus 11 distributes, via the information communication network 15, the captured image Vd of the vehicle interior 6 to the second image analysis apparatus 22 mounted in the information processing apparatus 20 that is outside the vehicle and constitutes the cloud server 17 (step 1102). As described above, at this time, the captured image Vd distributed to the second image analysis apparatus 22 is the captured image VdL compressed at the relatively low compression rate βL.

Next, the second image analysis apparatus 22 that receives the captured image Vd executes the detection and determination of the abnormality for the vehicle interior 6 imaged in the captured image Vd (step 1103). As described above, the detection and determination of the abnormality is performed by detecting the skeleton points SP of the occupant 5 imaged in the captured image Vd and acquiring the occupant information Ich. Further, in the example, by executing the detection and determination of the abnormality, it is confirmed in the second image analysis apparatus 22 that no abnormality occurs in the vehicle interior 6 imaged in the captured image Vd, so that the second image analysis apparatus 22 transmits the normality confirmation signal S8 (step 1104). Then, when the first image analysis apparatus 11 receives the normality confirmation signal S8, the distribution of the captured image Vd to the second image analysis apparatus 22 is stopped (step 1105).

On the other hand, FIG. 22 is an example of a case in which the state change occurring in the vehicle interior 6 imaged in the captured image Vd is, for example, a change actually determined to be the "abnormality", such as falling down of the occupant 5.

Also in this example, first, the first image analysis apparatus 11 detects the state change occurring in the vehicle interior 6 (step 1201). Further, based on the detection of the state change, the first image analysis apparatus 11 starts the distribution of the captured image Vd to the second image analysis apparatus 22 (step 1202). Then, in this example, the abnormality occurring in the vehicle interior 6 imaged in the captured image Vd is detected by the detection and determination of the abnormality which is executed by the second image analysis apparatus 22 (step 1203).

In this case, the second image analysis apparatus 22 subsequently transmits the abnormality detection signal S1 (step 1204). Further, when the first image analysis apparatus 11 receives the abnormality detection signal S1, the captured image Vd is started to be distributed, via the information communication network 15, to the operator 32 as the administrator 31 who stands by in the operation center 30 of the vehicle 1 (step 1205). Thus, the captured image Vd of the vehicle interior 6 is displayed on the display 70 of the image receiving apparatus 33 provided in the operation center 30 (step 1206).

As described above, at this time, the captured image Vd of the vehicle interior 6 distributed to the operator 32 is the captured image VdH compressed at the compression rate βH higher than the compression rate βL of the captured image VdL distributed to the second image analysis apparatus 22 (βH>βL). Along with display of the captured image Vd, the notification output is executed for a content of the abnormality detection signal S1, that is, a content indicating that the occurrence of the abnormality in the vehicle interior 6 of the vehicle 1 which is the monitored space 41 is detected.

In this example, the operator 32 inputs an operation of requesting the call connection with the vehicle 1 to the operation terminal 34 provided in the operation center 30 (step 1207). Further, the call request signal S4 is transmitted from the information processing apparatus 35 of the operation center 30 by inputting the call connection request, and the call connection between the vehicle 1 and the operation center 30 is established when the vehicle 1 receives the call request signal S4 (step 1208). In this example, the operator 32 "speaks" to the occupant 5 imaged in the captured image Vd of the vehicle interior 6 (step 1209), and thus it is confirmed that no abnormality occurs in the vehicle interior 6 of the vehicle 1.

Next, the operator 32 inputs the normality confirmation operation to the operation terminal 34, so that the normality confirmation signal S6 is transmitted from the information processing apparatus 35 of the operation center 30 (step 1210). Then, when the first image analysis apparatus 11 in the vehicle 1 receives the normality confirmation signal S6, the distribution of the captured image Vd to the operator 32 is stopped (step 1211).

Next, effects of the present embodiment will be described.

(1) The monitoring system 40 includes the first image analysis apparatus 11 that is provided, together with the camera 8, in the vehicle 1 serving as the edge E of the information communication network 15. The first image analysis apparatus 11 analyzes the captured image Vd of the vehicle interior 6 imaged by the camera 8 so as to execute detection and determination of the state change in the vehicle interior 6. In addition, the first image analysis apparatus 11 has a function as an image distribution apparatus 80 that executes the distribution of the captured image Vd via the information communication network 15 when the occurrence of the state change is detected in the vehicle interior 6 which is the monitored space 41. Further, the monitoring system 40 includes the second image analysis apparatus 22 that analyzes the captured image Vd of the vehicle interior 6 distributed via the information communication network 15 so as to execute the detection and determination of the abnormality occurring in the vehicle interior 6.

According to the above configuration, the first image analysis apparatus 11 provided in the vehicle 1 can detect the state change occurring in the vehicle interior 6 imaged in the captured image Vd. The second image analysis apparatus 22 can detect the abnormality occurring in the vehicle interior 6 imaged in the captured image Vd with high accuracy via the information communication network 15 by analyzing the captured image Vd of the vehicle interior 6 distributed due to the detection of the state change.

Further, the detection and determination of the state change performed by the analysis of the captured image Vd has a smaller calculation load than the detection and determination of the abnormality performed by the analysis of the captured image Vd. Therefore, the in-vehicle information processing apparatus 10 in which the first image analysis apparatus 11 is mounted has an advantage that a required calculation processing capability thereof can be controlled to be relatively small. When the state change in the vehicle interior 6 is not detected, the distribution of the captured image Vd via the information communication network 15 is not performed, and thus the communication load can be reduced.

(2) The first image analysis apparatus 11 includes the pixel difference value calculation unit 51 that acquires the captured image Vd in each analysis period and calculates the pixel difference value δ between the previous frame Fb acquired in the previous analysis period and the current frame Fc acquired in the current analysis period. In addition, the first image analysis apparatus 11 includes: the history holding unit 52 that holds the calculation history X of the pixel difference value δ; and the variance value calculation unit 53 that calculates the variance value Y of the pixel difference value δ based on the calculation history X. Further, the first image analysis apparatus 11 includes the state change determination unit 54 that determines that the state change occurs in the vehicle interior 6 imaged in the captured image Vd when the variance value Y of the pixel difference value δ is equal to or greater than the predetermined threshold value Yth.

According to the above configuration, the detection and determination of the state change based on the analysis of the captured image Vd can be performed with a relatively small calculation load and with high accuracy. Thus, the abnormality can be detected with high accuracy via the information communication network 15 while ensuring excellent in-vehicle performance.

In addition, by using the pixel difference value δ between the previous frame Fb and the current frame Fc of the captured image Vd acquired in each analysis period, influence of an external environment of the vehicle interior 6, for example, a change in light amount or the like, can be reduced.

(3) The pixel difference value calculation unit 51 sets the boarding area α0 of the occupant 5 in the vehicle interior 6 as the detection area α set in advance in the vehicle interior 6 and calculates the pixel difference value δ only for the boarding area α0.

According to the above configuration, it is possible to detect with high accuracy the state change occurring in the boarding area α0 set in the detection area α, that is, the state change occurring in the vehicle interior 6 for the occupant 5 in the vehicle interior 6 who is on board the vehicle 1. Thus, occurrence of erroneous determination can be prevented, and the abnormality can be detected with higher accuracy via the information communication network 15.

(4) The first image analysis apparatus 11 serving as the image distribution apparatus 80 has a function of distributing, via the information communication network 15, the captured image Vd to the operator 32 as the administrator 31 who is located in the operation center 30 of the vehicle 1. The first image analysis apparatus 11 distributes the captured image VdH to the operator 32 at the compression rate β higher than that of the captured image VdL distributed to the second image analysis apparatus 22.

That is, even when the captured image Vd having the high compression rate has the low resolution, in many cases, the situation in the vehicle interior 6 imaged in the captured image Vd can be grasped without any problem by confirming the captured image Vd with the eyes of the person, that is, by the operator 32 as the administrator 31. Therefore, according to the above configuration, a multi-layered system in which monitoring performed by the administrator 31 is added can be constructed while preventing an increase in communication load. Thus, the abnormality can be detected with higher accuracy via the information communication network 15.

(5) The first image analysis apparatus 11 serving as the image distribution apparatus 80 executes the distribution of the captured image Vd to the operator 32 when the abnormality occurring in the vehicle interior 6 imaged in the captured image Vd is detected by the second image analysis apparatus 22.

According to the above configuration, the operator 32 as the administrator 31 can quickly confirm the abnormality occurring in the vehicle interior 6. Thus, it is possible to ensure quick coping with the abnormality occurring in the vehicle interior 6. By limiting a situation in which the captured image Vd is distributed to the operator 32, the increase in communication load can be prevented.

(6) The first image analysis apparatus 11 serving as the image distribution apparatus 80 executes the distribution of the captured image Vd to the operator 32 when it is determined that the detection and determination of the abnormality occurring in the vehicle interior 6 is not able to be performed or the accuracy for the detection and determination decreases in the second image analysis apparatus 22.

According to the above configuration, by the operator 32 as the administrator 31 confirming the captured image Vd of the vehicle interior 6, it is possible to ensure that the abnormality is detected with high accuracy via the information communication network 15. By limiting the situation in which the captured image Vd is distributed to the operator 32, the increase in communication load can be prevented.

(7) The second image analysis apparatus 22 includes the skeleton point detection unit 63 that detects the skeleton points SP of the occupant 5 included in the captured image Vd. The second image analysis apparatus 22 includes the abnormality detection unit 62 that detects the abnormality occurring in the vehicle interior 6 based on the occupant information Ich acquired by the detection of the skeleton points SP. Further, the second image analysis apparatus 22 includes the detection state determination unit 69 that determines the detection state of the skeleton points SP. In the monitoring system 40, whether to execute the distribution of the captured image Vd to the operator 32 is determined based on the detection state of the skeleton points SP.

According to the above configuration, it is possible to specify with high accuracy a state in which the second image analysis apparatus 22 cannot perform the detection and determination of the abnormality in the captured image Vd or the accuracy for the detection and determination decreases. Thus, it is possible to appropriately determine whether to execute the distribution of the captured image Vd to the operator 32. As a result, it is possible to avoid a situation in which the captured image Vd of the vehicle interior 6 is frequently distributed to the operator 32, and to prevent the increase in communication load.

In addition, by detecting the skeleton points SP, the physical occupant information Ich such as a posture and a physique of the occupant 5 can be acquired with high accuracy. Thus, based on the acquired occupant information Ich, it is possible to perform, with high accuracy, the detection and determination of the abnormality for the vehicle interior 6 in which the occupant 5 is on board.

(8) The monitoring system 40 is configured to change, based on the request from the operator 32, the compression rate β of the captured image Vd to be distributed to the operator 32.

According to the above configuration, the captured image Vd of the vehicle interior 6 can be confirmed by the operator 32 at an appropriate resolution while preventing the increase in communication load. Thus, the abnormality can be detected with higher accuracy via the information communication network 15.

The above embodiment can be modified and implemented as follows. The above embodiment and the following modifications can be implemented in combination with each other as long as the embodiment and the modifications are technically not in conflict with each other.

In the above embodiment, the infrared camera is used as the camera 8, but a model thereof may be appropriately changed. For example, a visible light camera or the like may be used. A plurality of cameras 8 may be used to capture an image of the monitored space 41.

In the above embodiment, the boarding area α0 of the occupant 5 in the vehicle interior 6 is set as the detection area α set in advance in the vehicle interior 6, and the pixel difference value δ is calculated only for the boarding area α0. However, setting of the detection area α for which the pixel difference value δ is calculated is not limited thereto, and may be appropriately changed.

The compression rate βL of the captured image VdL distributed to the second image analysis apparatus 22 and the compression rate βH of the captured image VdH distributed to the operator 32 as the administrator 31 may be appropriately set. From the viewpoint of preventing the increase in communication load, it is preferable that the compression rate βH of the captured image VdH distributed to the operator 32 is higher than the compression rate βL of the captured image VdL distributed to the second image analysis apparatus 22 (βH>βL). It is desirable to ensure that the captured image VdL distributed to the second image analysis apparatus 22 has a high resolution enough to allow the skeleton points SP to be detected with high accuracy. It is desirable that the captured image VdH distributed to the operator 32 has a small communication traffic by which the increase in communication load can be prevented.

The captured image Vd may be distributed to the operator 32 at the compression rate β that is equal to that of the captured image Vd distributed to the second image analysis apparatus 22. Further, the captured image Vd distributed to the operator 32 may have the compression rate β lower than that of the captured image Vd distributed to the second image analysis apparatus 22.

In the above embodiment, whether to execute the distribution of the captured image Vd to the operator 32 is determined based on the detection state of the skeleton points SP. However, the disclosure is not limited thereto, and determination about whether to allow the distribution of the captured image Vd, that is, determination that the detection and determination of the abnormality occurring in the vehicle interior 6 is not able to be performed or the accuracy for the detection and determination decreases in the second image analysis apparatus 22, may not necessarily be based on the detection state of the skeleton points SP.

In the above embodiment, the posture of the occupant 5 is determined based on the detection of the skeleton points SR The abnormality in the vehicle interior 6 imaged in the captured image Vd is detected by detecting the falling posture. However, the disclosure is not limited thereto, and for example, it may be determined that the abnormality occurs in the vehicle interior 6 when the occupant 5 moving in the vehicle interior 6 is detected during travelling of the vehicle 1. The detection and determination of the abnormality may be executed by using other occupant information Ich acquired by image analysis of the captured image Vd.

Further, the detection and determination of the abnormality occurring in the vehicle interior 6 performed by the second image analysis apparatus 22 may not necessarily be based on the detection of the skeleton points SR Other methods using so-called artificial intelligence (AI) techniques such as deep learning and machine learning may also be used to perform the detection and determination of the abnormality as long as the other methods are based on the analysis of the captured image Vd imaged by the camera 8. The abnormality occurring in the vehicle interior 6 may be detected for a target other than the person H.

The detection and determination of the state change occurring in the vehicle interior 6 performed by the first image analysis apparatus 11 may not necessarily be based on the variance value Y of the pixel difference value δ between the previous frame Fb and the current frame Fc of the captured image Vd acquired in each analysis period. Any method based on the analysis of the captured image Vd imaged by the camera 8 may be used. However, in consideration of optimal allocation of a calculation capability, it is preferable that the detection and determination of the state change performed by the first image analysis apparatus 11 has a smaller calculation load than the detection and determination of the abnormality performed by the second image analysis apparatus 22.

In the above embodiment, the operator 32 standing by in the operation center 30 of the vehicle 1 is set as the administrator 31, and the captured image VdH is distributed to the administrator 31 at the high compression rate βH. However, setting of the administrator 31 is not limited thereto, and may be appropriately changed. For example, the administrator 31 may not necessarily stand by at one place. Further, the image receiving apparatus 33 for the captured image Vd may also be appropriately changed, and may be, for example, a mobile terminal. A method for inputting the request by the administrator 31 may also be appropriately set, and may be, for example, voice input or the like.

In the above embodiment, the first image analysis apparatus 11 is used as the image distribution apparatus 80 to distribute the captured image Vd to the administrator 31. However, the disclosure is not limited thereto, and the second image analysis apparatus 22 may generate the captured image VdH having the high compression rate βH by compressing the received captured image VdL and transmit the captured image VdH to the information processing apparatus 35 of the operation center 30. The image distribution apparatus 80 may be provided separately from the first image analysis apparatus 11 and the second image analysis apparatus 22.

In the above embodiment, when the second image analysis apparatus 22 detects the abnormality, the abnormality cannot be detected by the second image analysis apparatus 22, or the accuracy for the detection and determination decreases, the captured image Vd is distributed to the operator 32. However, the disclosure is not limited thereto, and the situation in which the captured image Vd is distributed to the operator 32 may be appropriately changed. Further, for example, the captured image VdH, which has the compression rate βH higher than the compression rate βL of the captured image VdL distributed to the second image analysis apparatus 22, may be constantly distributed to the administrator 31. Further, the captured image Vd may not be distributed to the administrator 31.

In the above embodiment, in the monitoring system 40, the monitored space 41 is embodied as the vehicle interior 6 of the vehicle 1 imaged by the camera 8. However, the monitored space 41 is not limited thereto, and may be a room interior of a building. For example, the monitored space 41 may also be set outdoors.

Next, technical ideas that can be understood from the above embodiment and modifications will be described.

(A) The detection area is the boarding area of the occupant. Thus, the state change occurring in the vehicle interior can be detected with high accuracy for the occupant in the vehicle interior who is on board the vehicle.

According to an aspect of this disclosure, a monitoring system includes: a first image analysis apparatus provided at an edge of an information communication network together with a camera, and configured to analyze a captured image of a monitored space imaged by the camera so as to execute detection and determination of a state change occurring in the monitored space; an image distribution apparatus configured to execute distribution of the captured image via the information communication network when occurrence of the state change is detected; and a second image analysis apparatus configured to analyze the distributed captured image so as to execute detection and determination of an abnormality occurring in the monitored space.

According to the above configuration, the first image analysis apparatus provided at the edge of the information communication network can detect the state change occurring in the monitored space imaged in the captured image. The second image analysis apparatus can analyze the captured image of the monitored space distributed due to detection of the state change, so that the abnormality occurring in the monitored space imaged in the captured image can be detected with high accuracy via the information communication network.

Further, the detection and determination of the state change performed by analysis of the captured image has a smaller calculation load than the detection and determination of the abnormality performed by analysis of the captured image. Therefore, an information processing apparatus in which the first image analysis apparatus is mounted has an advantage that a required calculation processing capability can be controlled to be relatively small. When the state change in the monitored space is not detected, the distribution of the captured image via the information communication network is not performed, and thus a communication load can be reduced.

According to the above aspect of the disclosure, it is preferable that in the monitoring system, the first image analysis apparatus includes: a pixel difference value calculation unit configured to acquire the captured image in each analysis period and calculate a pixel difference value between a previous frame of the captured image acquired in a previous analysis period and a current frame of the captured image acquired in a current analysis period; a history holding unit configured to hold a calculation history of the pixel difference value; a variance value calculation unit configured to calculate a variance value of the pixel difference value based on the calculation history; and a state change determination unit configured to determine that the state change occurs in the monitored space when the variance value is equal to or greater than a predetermined threshold value.

According to the above configuration, the detection and determination of the state change based on the analysis of the captured image can be performed with a relatively small calculation load and with high accuracy. Thus, the abnormality can be detected with high accuracy via the information communication network while ensuring a high degree of freedom in installation.

In addition, by using the pixel difference value between the previous frame and the current frame of the captured image acquired in each analysis period, influence of an external environment of the monitored space, for example, a change in light amount or the like, can be reduced.

According to the above aspect of the disclosure, it is preferable that in the monitoring system, the pixel difference value calculation unit is configured to calculate the pixel difference value only for a detection area set in advance in the monitored space.

According to the above configuration, a state change occurring in the detection area set in advance in the monitored space can be detected with high accuracy. Thus, occurrence of erroneous determination can be prevented, and the abnormality can be detected with higher accuracy via the information communication network.

According to the above aspect of the disclosure, it is preferable that in the monitoring system, the image distribution apparatus is configured to execute the distribution of the captured image to an administrator located outside the monitored space when occurrence of the abnormality is detected in the second image analysis apparatus.

According to the above configuration, the administrator can quickly confirm the abnormality occurring in the monitored space. Thus, it is possible to ensure quick coping with the abnormality occurring in the monitored space. By limiting a situation in which the captured image is distributed to the administrator, an increase in communication load can be prevented.

According to the above aspect of the disclosure, it is preferable that in the monitoring system, the image distribution apparatus is configured to execute the distribution of the captured image to an administrator located outside the monitored space at a compression rate higher than that of the captured image distributed to the second image analysis apparatus.

That is, even when the captured image having a high compression rate has a low resolution, in many cases, a situation of the monitored space imaged in the captured image can be grasped without any problem by confirming the captured image with eyes of a person, that is, by the administrator. Therefore, according to the above configuration, a multi-layered system in which monitoring of the administrator is added can be constructed while preventing the increase in communication load. Thus, the abnormality can be detected with higher accuracy via the information communication network.

According to the above aspect of the disclosure, it is preferable that the monitoring system is configured to change, based on a request from the administrator, the compression rate of the captured image to be distributed to the administrator.

According to the above configuration, the captured image of the monitored space can be confirmed by the administrator at an appropriate resolution while preventing the increase in communication load. Thus, the abnormality can be detected with higher accuracy via the information communication network.

According to the above aspect of the disclosure, it is preferable that in the monitoring system, the image distribution apparatus is configured to, when it is determined that the detection and determination is not able to be performed or accuracy for the detection and determination decreases in the second image analysis apparatus, execute the distribution of the captured image to the administrator.

According to the above configuration, by the administrator confirming the captured image of the monitored space, it is possible to ensure that the abnormality is detected with high accuracy via the information communication network. By limiting the situation in which the captured image is distributed to the administrator, the increase in communication load can be prevented.

According to the above aspect of the disclosure, it is preferable that in the monitoring system, the second image analysis apparatus is configured to detect a skeleton point of a person included in the captured image, and execute the detection and determination based on information of the person acquired by the detection of the skeleton point, and whether to execute the distribution of the captured image to the administrator is determined based on a detection state of the skeleton point.

According to the above configuration, it is possible to specify with high accuracy a state in which the second image analysis apparatus cannot perform the detection and determination of the abnormality by the analysis of the captured image or the accuracy for the detection and determination decreases. Thus, it is possible to appropriately determine whether to execute the distribution of the captured image to the administrator. As a result, it is possible to avoid a situation in which the captured image of the monitored space is frequently distributed to the administrator, and to prevent the increase in communication load.

In addition, by detecting the skeleton point, physical information such as a posture and a physique of the person can be acquired with high accuracy. Thus, the detection and determination of the abnormality can be performed with high accuracy based on the acquired information of the person.

According to the above aspect of the disclosure, it is preferable that in the monitoring system, the monitored space is a vehicle interior of a vehicle.

According to the above configuration, the abnormality occurring in the vehicle interior of the vehicle can be detected with high accuracy via the information communication network.

According to this disclosure, the abnormality can be detected with high accuracy via the information communication network.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A monitoring system comprising:
a first image analysis apparatus provided at an edge of an information communication network together with a camera, and configured to analyze a captured image of a monitored space imaged by the camera so as to execute detection and determination of a state change occurring in the monitored space;
an image distribution apparatus configured to execute distribution of the captured image via the information communication network when occurrence of the state change is detected; and
a second image analysis apparatus configured to analyze the distributed captured image so as to execute detection and determination of an abnormality occurring in the monitored space,
wherein
the first image analysis apparatus includes:
a pixel difference value calculation unit configured to acquire the captured image in each analysis period and calculate a pixel difference value between a previous frame of the captured image acquired in a previous analysis period and a current frame of the captured image acquired in a current analysis period;
a history holding unit configured to hold a calculation history of the pixel difference value;
a variance value calculation unit configured to calculate a variance value of the pixel difference value based on the calculation history; and
a state change determination unit configured to determine that the state change occurs in the monitored space when the variance value is equal to or greater than a predetermined threshold value.

2. The monitoring system according to claim 1, wherein the pixel difference value calculation unit is configured to calculate the pixel difference value only for a detection area set in advance in the monitored space.

3. The monitoring system according to claim 1, wherein the image distribution apparatus is configured to execute the distribution of the captured image to an administrator located outside the monitored space when occurrence of the abnormality is detected in the second image analysis apparatus.

4. The monitoring system according to claim 1, wherein the image distribution apparatus is configured to execute the distribution of the captured image to an administrator located outside the monitored space at a compression rate higher than that of the captured image distributed to the second image analysis apparatus.

5. The monitoring system according to claim 4, wherein the monitoring system is configured to change, based on a request from the administrator, the compression rate of the captured image to be distributed to the administrator.

6. The monitoring system according to claim 1, wherein the monitored space is a vehicle interior of a vehicle.

\* \* \* \* \*